United States Patent
Lubas et al.

(10) Patent No.: US 10,656,008 B2
(45) Date of Patent: May 19, 2020

(54) SYSTEM AND METHOD FOR DISCOVERING THE TOPOLOGY OF DEVICES WITHIN A BUILDING AUTOMATION AND CONTROL SYSTEM

(71) Applicant: Sway sp. z o.o., Cracow (PL)

(72) Inventors: Robert Mieczyslaw Lubas, Przysieki (PL); Szymon Slupik, Cracow (PL); Maciej Witalinski, Jaworzno (PL)

(73) Assignee: Sway sp. z o.o., Cracow (PL)

( * ) Notice: Subject to any disclaimer, the term of this patent is extended or adjusted under 35 U.S.C. 154(b) by 0 days.

(21) Appl. No.: 16/168,757

(22) Filed: Oct. 23, 2018

(65) Prior Publication Data

US 2020/0124466 A1    Apr. 23, 2020

(51) Int. Cl.
| | | |
|---|---|---|
| *G01J 1/02* | (2006.01) | |
| *H05B 39/04* | (2006.01) | |
| *G01J 1/06* | (2006.01) | |
| *H05B 47/11* | (2020.01) | |

(52) U.S. Cl.
CPC .............. *G01J 1/0242* (2013.01); *G01J 1/06* (2013.01); *H05B 39/041* (2013.01); *H05B 47/11* (2020.01)

(58) Field of Classification Search
CPC ........ G01J 1/0242; G01S 11/12; G01B 11/14; G01V 8/20; H05B 39/041
See application file for complete search history.

(56) References Cited

U.S. PATENT DOCUMENTS

| | | | |
|---|---|---|---|
| 5,026,153 A * | 6/1991 | Suzuki | G01S 11/12 |
| | | | 356/3.16 |
| 7,592,583 B2 | 9/2009 | Page et al. | |
| 7,683,301 B2 * | 3/2010 | Papamichael | H05B 39/042 |
| | | | 250/205 |
| 9,041,941 B2 * | 5/2015 | Morbee | G01V 8/20 |
| | | | 356/614 |
| 2013/0342852 A1 * | 12/2013 | Fujimoto | G01B 11/14 |
| | | | 356/614 |

* cited by examiner

*Primary Examiner* — Hung Nguyen
(74) *Attorney, Agent, or Firm* — McGeary Cukor LLC; Kenneth Ottesen; Jason Paul DeMont

(57) ABSTRACT

A method for discovering the topology of a connected lighting system. The method comprises: receiving a first measurement of a first light source in relation to a first sensor; receiving a second measurement of the first light source in relation to a second sensor; generating a first estimate of the position of the first light source, based on a first angle at the first sensor between (i) a first direction toward a current light source position and (ii) a second direction defined by the first measurement; generating a second estimate of the position of the first light source, based on a second angle at the second sensor between (i) a third direction toward the current light source position and (ii) a fourth direction defined by the second measurement; and generating an updated light source position of the first light source based on the first and second estimates.

9 Claims, 17 Drawing Sheets

701

SYSTEM AND METHOD FOR DISCOVERING THE TOPOLOGY OF DEVICES WITHIN A BUILDING AUTOMATION AND CONTROL SYSTEM

CROSS REFERENCE TO RELATED APPLICATIONS

This application is related to "Configurable Light Sensor Comprising a Photocell Array," U.S. application Ser. No. 16/168,755, filed on the same day as the present application and incorporated by reference herein.

FIELD OF THE INVENTION

The present invention relates to building automation and control in general, and, more particularly, to discovering the topology of devices within a building automation and control system, including the measuring of the angular position of one or more of the devices.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, both from a technological and cost perspective.

Lighting automation, in particular, has evolved over time. Lighting systems now exist in which luminaires that comprise control logic and controllable lamps are networked together, in what is sometimes referred to as "connected lighting" or networked "smart lighting." In such a network of "smart nodes," the sensors that are associated with the luminaires collect data about the local environment, such as data related to occupancy and data related to ambient lighting in the vicinity of the luminaires. The networked sensors and luminaires communicate with one other and adjust the light output of the lamps via the control logic, in some cases based on the sensor data.

There can be a large number of such connected devices within a building, in the hundreds, or even thousands, of devices sharing data with one another. Consequently, there are various issues to consider in planning and implementing a system of connected devices, so that the devices are installed and operate in a coordinated way. For example, it is important for an engineer who is commissioning a connected lighting system to have knowledge of the connected system's topology, which includes having knowledge of the way in which the constituent devices are interrelated or arranged, and of where each device is within a building, within a room within the building, and in relation to one or more other devices within the connected system. Understanding the layout of light sources and sensors is important for various applications, including configuring daylight harvesting scenarios, organizing the light sources in groups, defining scenes, and performing maintenance. However, discovering the connected system's topology manually can be labor-intensive and, consequently, can be costly, in some cases prohibitively costly.

Thus, what is needed is a technique for discovering the topology of a connected system, without at least some of the disadvantages and costs in the prior art.

SUMMARY OF THE INVENTION

The present invention relates to a light sensor that comprises a matrix of photocells, wherein the light sensor is a node within a connected lighting system and under the control of a configuring device. The configuring device coordinates the discovery of the topology of the connected lighting system, as described below. The light sensor of the illustrative embodiment measures ambient light provided by a light source and reflected from a surface in an area to be monitored, wherein the light source can be another node within the connected lighting system. A microcontroller in the light sensor reads each individual photocell and processes the signals from the photocells according to one or more of the methods disclosed herein, in order to compute and report an angle of the location of a light source in the connected lighting system. The configuring device uses the computed angle as part of the topology discovery process. Subsequently, the sensor node can monitor an area and report sensor output values based on measurements made from the photocells.

In accordance with the illustrative embodiment, and while under the control of a configuring device within the connected lighting system, the light sensor computes the angle of the location of the light source, which is the angular position of the light source in relation to the light sensor, through two stages of measurement. In a first stage of measurement, the sensor measures the background in the area served by the connected lighting system. For example, the measurement occurs when all of the light sources in the area are turned on and emitting light. In a second stage of measurement, which can occur either after or before the first stage, the sensor measures the light after the output of the particular light source is changed, typically after the light source is turned off. The angular position of the light source is determined based on one or more differences between the first and second stages of measurement, as disclosed herein. The light sensor then reports the value of the angular position to the configuring device, which can present the information to a user, store the information for future use, and/or transmit the information to another data-processing system.

In accordance with the illustrative embodiment, the configuring device discovers the topology of the connected lighting system, first by generating a data set that includes the angular positions of one or more light sources and obtained from one or more sensor nodes, and then by iteratively computing the spatial position, relative or absolute, of each non-anchored component in the lighting system that is, of each component for which the location of the component is unknown prior to the iterative process. In particular, each iteration of the processing includes computing the spatial position of each non-anchored light source, computing the spatial position of each non-anchored sensor node, scaling the distances among the components, as needed, and performing a convergence check in order to determine whether the topology discovery process has progressed sufficiently.

By performing the discovery process automatically, the configuring device of the illustrative embodiment, in concert with the light sensors computing angular positions, reduces or eliminates the need for an engineering technician to perform the discovery process manually, thereby saving time and money.

A first illustrative node comprising: a photocell matrix comprising at least three photocells configured to sense light levels and to provide a plurality of illuminance signals that represent the light levels, wherein the at least three photocells are arranged such that at least two photocells are along each of a first dimension and a second dimension of the photocell matrix; a controller configured to: i) measure light levels sensed by the at least three photocells at a first time and in response to the first node receiving a first input signal, resulting in a plurality of first measurements, wherein the controller makes the first measurements from illuminance signals received via a first signal path and that represent the light levels sensed by the at least three photocells at the first time, ii) measure light levels sensed by the at least three photocells at a second time, resulting in a plurality of second measurements, wherein the controller makes the second measurements from illuminance signals received via the first signal path and that represent the light levels sensed by the at least three photocells at the second time, and wherein the first and second times are different from each other, and iii) compute a first angle across the first and second dimensions based on a first difference between at least one of the first measurements and at least one of the second measurements; and a communication interface configured to: i) receive the first input signal, and ii) transmit a first output signal that represents the first angle.

A first illustrative method comprising: receiving a first signal; measuring light levels sensed by at least three photocells in a photocell matrix at a first time and in response to receiving the first signal, resulting in a plurality of first measurements, wherein the first measurements are made from illuminance signals that represent the light levels sensed by the at least three photocells at the first time, and wherein the at least three photocells are arranged such that at least two photocells are along each of a first dimension and a second dimension of the photocell matrix; measuring light levels sensed by the at least three photocells in the photocell matrix at a second time, resulting in a plurality of second measurements, wherein the second measurements are made from illuminance signals that represent the light levels sensed by the at least three photocells at the second time, and wherein the first and second times are different from each other; computing a first angle across the first and second dimensions from a first difference between at least one of the first measurements and at least one of the second measurements; and transmitting a first output signal that represents the first angle.

A second illustrative method comprising: receiving, by the data-processing system, a first measurement of the first light source in relation to a first sensor, wherein the first measurement is received from the first sensor; receiving, by the data-processing system, a second measurement of the first light source in relation to a second sensor, wherein the second measurement is received from the second sensor; generating a first estimate of the position of the first light source, based on a first angle at the first sensor between (i) a first direction toward a current light source position and (ii) a second direction that is defined by the first measurement; generating a second estimate of the position of the first light source, based on a second angle at the second sensor between (i) a third direction toward the current light source position and (ii) a fourth direction that is defined by the second measurement; generating an updated light source position of the first light source based on the first estimate and the second estimate; and presenting the updated light source position of the first light source to a user.

DETAILED DESCRIPTION

Figure 1:
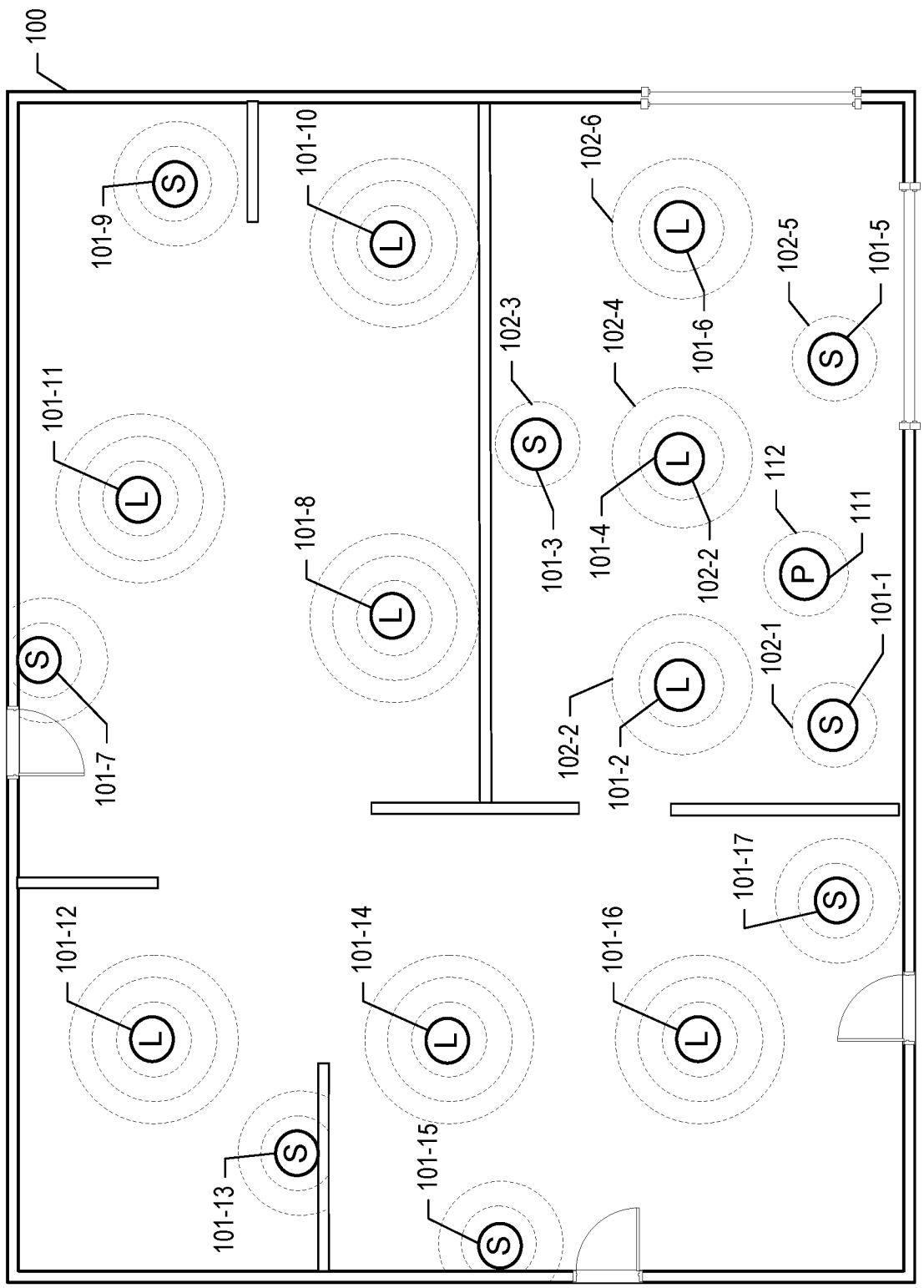
FIG. 1 illustrates a floor plan of building 100 in accordance with the illustrative embodiment of the present invention, within which smart nodes are physically situated.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller—For the purposes of this specification, the term "controller" is defined as hardware or hardware and software that perform mathematical and/or logical operations and that control other devices based, at least in part, on the operations performed.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire, or "luminaire node," is defined as a lighting unit comprising a lamp and a controller for controlling the lamp.

Light source—For the purposes of this specification, the term "light source" is defined as being either a luminaire, which comprises a lamp, or the lamp itself, which can be part of either a luminaire node or a different type of connected node (e.g., a sensor node, etc.).

Measure—For the purposes of this specification, the infinitive "to measure" and its inflected forms (e.g., "measuring", "measured", etc.) should be given the ordinary and customary meaning that the terms would have to a person of ordinary skill in the art at the time of the invention.

Photocell—For the purposes of this specification, the term "photocell," or "photoelectric cell," is defined as a device that generates an electric current or voltage dependent on the degree of illumination.

Position—For the purposes of this specification, the term "position," is defined as a place where someone or something is located or has been put.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Sensor node—For the purposes of this specification, the term "sensor node" is defined as a unit comprising one or more sensors for detecting one or more physical conditions and a controller for responding to information received from the one or more sensors.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

FIG. 1 illustrates a floor plan of building 100 in accordance with the illustrative embodiment of the present invention, within which smart nodes are physically situated according to the floor plan. Building 100 is equipped with smart nodes 101-1 through 101-M, wherein M is a positive integer (e.g., M equal to 17 as depicted, etc.). As depicted in FIG. 1, nodes 101-1, 101-3, 101-5, 101-7, 101-9, 101-13, 101-15, and 101-17 are light sensors (denoted by "S" in the figure). Nodes 101-2, 101-4, 101-6, 101-8, 101-10, 101-11, 101-12, 101-14, and 101-16 are light fixtures, or "luminaires," (denoted by "L"). In some embodiments of the present invention, the light sensors are specifically ambient light sensors. Wireless device 111 (denoted by "P") is also present within building 100. The networked nodes communicate wirelessly with one another via transmitted signals within a data network. In some alternative embodiments of the present invention, however, one or more of the depicted elements can communicate via wired connections.

The connected lighting system in FIG. 1 includes 17 smart nodes configured with one smartphone, with eight light sensors and nine luminaires. As those who are skilled in the art will appreciate, after reading this specification, various embodiments of the present invention can include a different total number of nodes and/or different numbers than depicted of the individual types of nodes.

Wireless device 111, a type of data-processing system, is a wireless telecommunications terminal that is configured to transmit and/or receive communications wirelessly. It is an apparatus that comprises memory, processing components, telecommunication components, and user interface components (e.g., display, speaker, keyboard, microphone, etc.). Wireless device 111 comprises the hardware and software necessary to be compliant with the protocol standards used in the wireless networks in which it operates and to perform the processes described below and in the accompanying figures. For example and without limitation, wireless device 111 is capable of:

i. handling an incoming or outgoing telephone call or other communication (e.g., application-specific data, SMS text, email, media stream, etc.), ii. provisioning one more devices into network nodes 101-1 through 101-M, and iv. Configuring one or more of network nodes 101-1 through 101-M.

Wireless device 111 is described in detail below and in FIG. 3.

Figure 2:
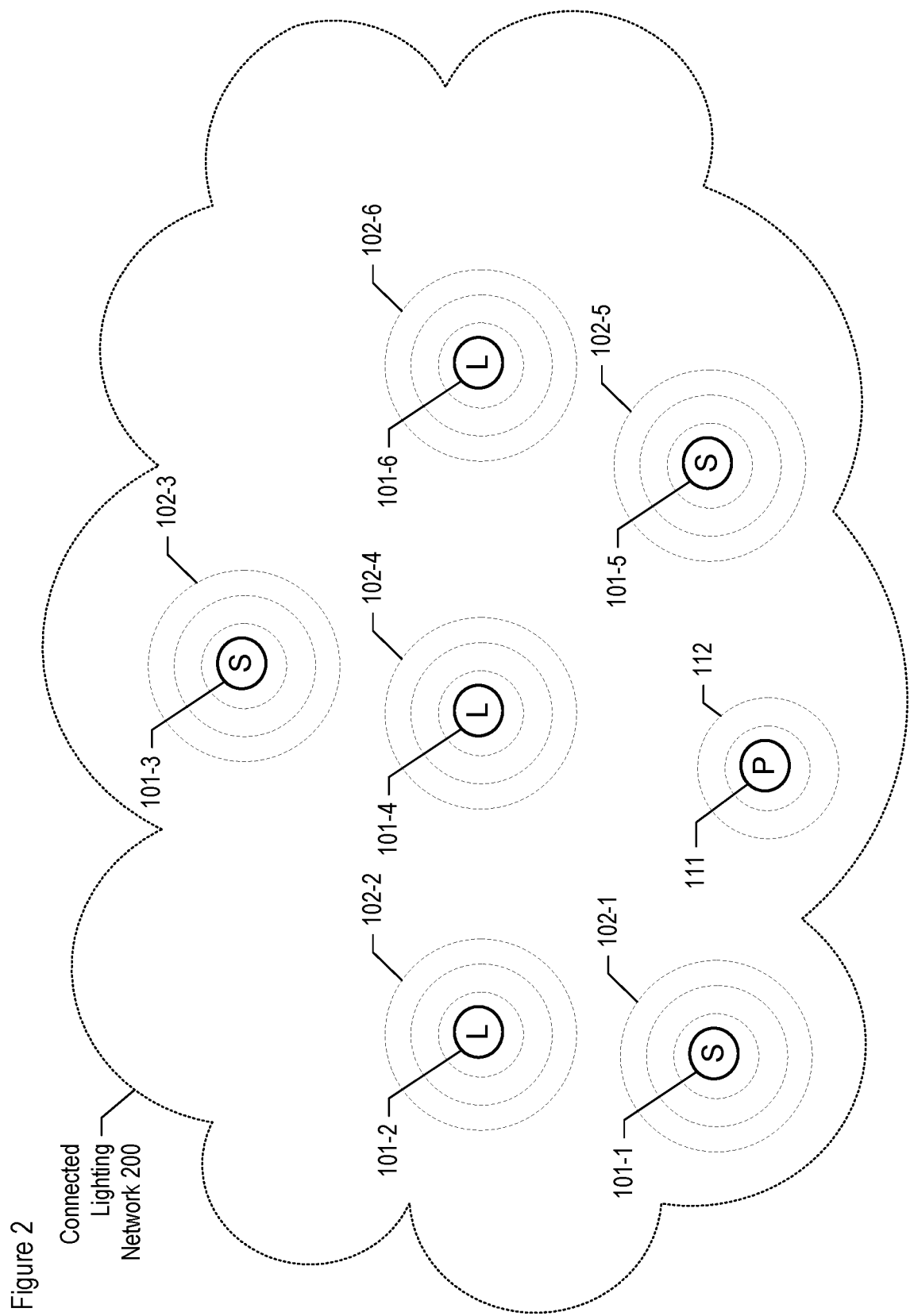
FIG. 2 depicts connected lighting network 200 in accordance with the illustrative embodiment.

Wireless device 111 is illustratively a smartphone with at least packet data capability provided and supported by one or more networks in which it operates, including data network 200 in FIG. 2. Device 111 is configured to execute a software application (e.g., an "app") for configuring one or more of the smart devices (e.g., lights, sensors, etc.) the data network. In particular, the application enables the configuring of one or more of the sensor nodes (e.g., by an installing technician, etc.).

In some embodiments of the present invention, device 111 is a different type of data-processing system, or executes an application that is different than a device-based app, or both. For example and without limitation, wireless device 111 can be referred to by a variety of alternative names such as, while not being limited to, a mobile station, a wireless transmit/receive unit (WTRU), a user equipment (UE), a wireless terminal, a cell phone, or a fixed or mobile subscriber unit. Wireless device 111 can be any other type of device (e.g., a tablet, etc.) that is capable of operating in a wireless network environment, mobility-oriented or otherwise.

In some embodiments of the present invention, device 111 comprises, or is itself, an Ethernet-to-Bluetooth gateway. In such embodiments, device 111 is wireless in the sense that it has and it uses a Bluetooth radio on one end of its gateway function, while the other end of the gateway function can interface to Ethernet cable (i.e., a wired interface). In some other embodiments, device 111 can be a different type of dedicated gateway.

Each smart node 101-m in FIG. 1, wherein m has a value between 1 and M, inclusive, is an apparatus that comprises memory, processing components, and communication components. Node 101-*m* is configured to transmit signals 102-*m* that convey control-related information, such as packet-based messages. Luminaire 101-*m* (i.e., nodes 101-2, 101-4, 101-6, etc.) is also configured to provide light at an output that is based, at least in part, on the content of one or more messages received from one or more other nodes. Sensor node 101-*m* (i.e., nodes 101-1, 101-3, 101-5, etc.) is also configured to sense one or more physical conditions, such as light, and can transmit messages based on the one or more physical conditions sensed. Node 101-*m* is described in detail below and in FIG. 4.

In accordance with the illustrative embodiment, nodes 101-1 through 101-17 constitute an automation and control system in a commercial building, such as an office space or a retail space. As those who are skilled in the art will appreciate after reading this specification, however, the system disclosed herein can also be applied to a different type of building, such as a home, or to include the environment surrounding the building, or to any environment in which automated control can be applied.

Furthermore, the building in which the nodes are situated can be any type of structure with a roof and walls, or can instead be a defined area that comprises multiple sub-areas (e.g., open space, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As those who are skilled in the art will appreciate after reading this specification, the nodes can be positioned in any geometry or geometries with respect to one another, provided that each node is within communication range of one or more of the other nodes.

In accordance with the illustrative embodiment, nodes 101-1 through 101-M constitute a connected lighting system. As those who are skilled in the art will appreciate after reading this specification, however, the system disclosed herein can also be applied to control a different type of domain than lighting. In other words, any reference herein to lighting system, light level, a light source, illuminance, a light sensor (e.g., photocell array or matrix, photocell, etc.), and any other lighting-related term, can be replaced with the corresponding term or terms related to a domain different than lighting.

For example and without limitation, a light sensor node and a luminaire node can be replaced respectively with a temperature sensor node and a heating and/or cooling unit in the climate control domain. In the foregoing example, terms corresponding to the list in the preceding paragraph can be temperature, a heating/cooling source, heat, a heat sensor (e.g., infrared sensor, etc.), respectively, although other equivalent terms can be used instead. As another non-limiting example, a light sensor node and a luminaire node can be replaced respectively with a sound/vibration sensor node and a loudspeaker in the sound or audio domain. In the foregoing example, terms corresponding to the list in the preceding paragraph can be sound level, a sound source (e.g., loudspeaker, etc.), sound, a sound sensor (e.g., microphone, etc.), respectively, although other equivalent terms can be used instead.

FIG. 2 depicts connected lighting network 200 in accordance with the illustrative embodiment. Network 200 comprises smart nodes 101-1 through 101-M and wireless device 111 from FIG. 1. For purposes of clarity, only light-sensor nodes 101-1, 101-3, and 101-5 and luminaire nodes 101-2, 101-4, and 101-6 are depicted in FIG. 2. The depicted nodes communicate wirelessly with one another via transmitted signals 102-1, 102-2, 102-3, 102-4, 102-5, 102-6, and 112.

Network 200 is a mesh data network that enables communication between wireless device 111 and smart nodes 101-1 through 101-M. To this end, the nodes within network 200 distribute data (e.g., the packet-based messages, etc.) in accordance with Bluetooth mesh networking. A "mesh network" is a network topology in which each node relays data for the network. The nodes that are involved cooperate in the distribution of data in the network. A mesh network can relay messages using either a flooding technique or a routing technique.

In some other embodiments, network 200 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on. Furthermore, as those who are skilled in the art will appreciate after reading this specification, wireless device 111 and at least some smart nodes 101-1 through 101-M in some embodiments can be connected directly and non-wirelessly to one other, at least for some purposes and/or for some portion of time, such as through Universal Serial Bus (USB), FireWire™, or Thunderbolt™, for example and without limitation.

Figure 3:
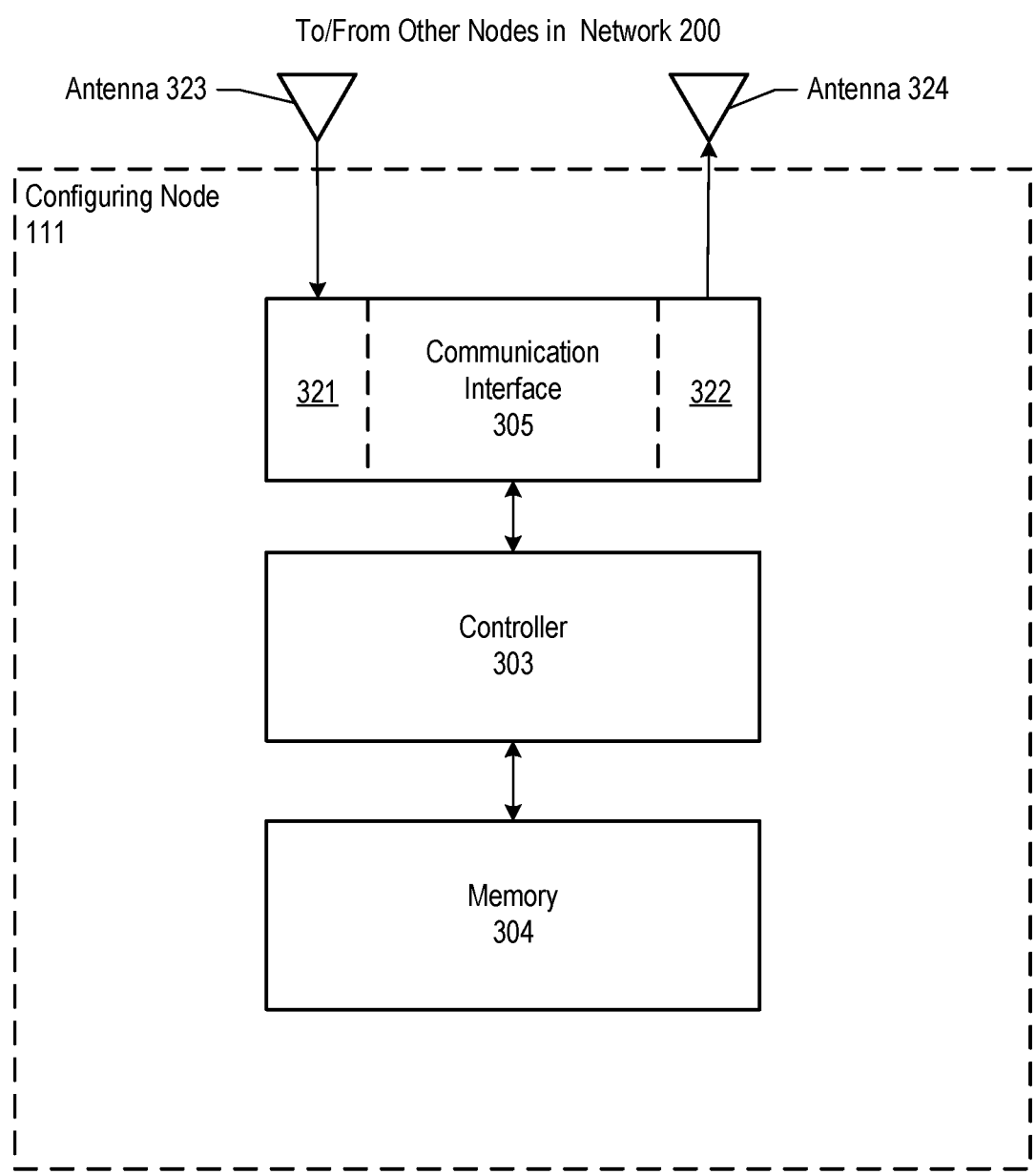
FIG. 3 depicts the salient components of wireless device 111 according to the illustrative embodiment.

FIG. 3 depicts the salient components of wireless device 111 according to the illustrative embodiment. Wireless device 111 is also referred to as the "configuring node." Wireless device 111 is based on a data-processing apparatus whose hardware platform comprises: controller 303, memory 304, and communication interface 305, interconnected as shown.

Controller 303 is a processing device, such as a microcontroller or microprocessor with a controller interface, which are well known in the art. Controller 303 is configured such that, when operating in conjunction with the other components of wireless device 111, controller 303 executes software, processes data, and telecommunicates according to the operations described herein.

Memory 304 is non-transitory and non-volatile computer storage memory technology that is well known in the art (e.g., flash memory, etc.). Memory 304 is configured to store an operating system, application software, and a database. The operating system is a collection of software that manages, in well-known fashion, wireless device 111's hardware resources and provides common services for computer programs, such as those that constitute the application software. The application software that is executed by controller 303 according to the illustrative embodiment enables wireless device 111 to perform the functions disclosed herein.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Communication interface 305 is configured to enable wireless device 111 to telecommunicate with other devices, by receiving signals therefrom and/or transmitting signals thereto via receiver 321 and transmitter 322, respectively. In order to communicate with devices outside of mesh network 200, communication interface 305 communicates in accordance with WiFi or other applicable standard. In order to communicate with other devices within mesh network 200, module 305 communicates in accordance with Bluetooth mesh networking. In some other embodiments, communication interface 305 communicates via one or more other radio telecommunications protocols other than or in addition to WiFi and Bluetooth mesh networking, such as, but not limited to, a cellular network standard (e.g., LTE, GSM, etc.), Z-Wave, ZigBee, Thread, Wi-Fi, straight Bluetooth Low Energy (BLE), classic Bluetooth, and so on.

Receiver 321 is a component that enables wireless device 111 to telecommunicate with other components and systems by receiving signals that convey information therefrom and through antenna 323. It will be clear to those having ordinary skill in the art how to make and use alternative embodiments that comprise more than one receiver 321.

Transmitter 322 is a component that enables wireless device 111 to telecommunicate with other components and systems by transmitting signals that convey information thereto and through antenna 324. It will be clear to those having ordinary skill in the art how to make and use alternative embodiments that comprise more than one transmitter 322.

In accordance with the illustrative embodiment, wireless device 111 uses communication interface 305 in order to telecommunicate wirelessly with external devices. It will clear to those skilled in the art, however, after reading the present disclosure, how to make use and use various embodiments of the present invention in which wireless device 111 communicates via a wired protocol (e.g., X10, KNX, etc.) over physical media (e.g., cable, wire, etc.) with one or more external devices, either in addition to or instead of the wireless capability provided by communication interface 305.

In some embodiments of the present invention, wireless device 111 is responsible for initiating the configuration process, by transmitting a command to one or more sensor nodes, including sensor node 101-1, wherein the command is for configuring the sensor node. The sensor node receives and acts upon the command as described below and in regard to FIG. 7.

Figure 4:
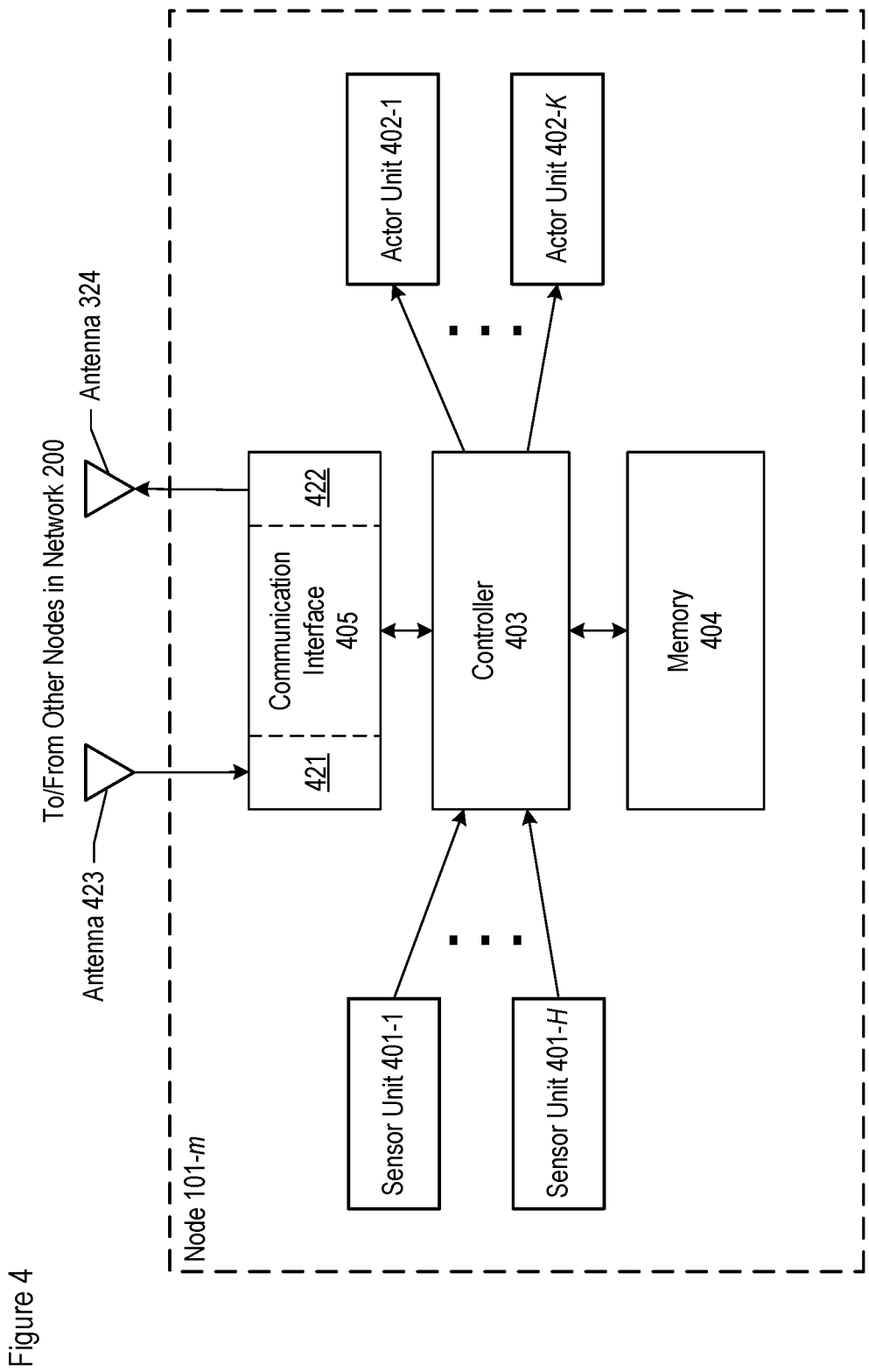
FIG. 4 depicts the salient components of smart node 101-$m$ according to the illustrative embodiment.

FIG. 4 depicts the salient components of smart node 101-$m$ according to the illustrative embodiment. Node 101-$m$ is based on a data-processing apparatus whose hardware platform comprises at least some of: sensor unit 401-1 through 401-H, wherein H is a positive integer, actor unit 402-1 through 402-K, wherein K is a positive integer, controller 403, memory 404, and communication interface 405, interconnected as shown.

Various nodes within mesh network 200 can comprise different combinations of sensors, actors, controllers, memory, and communications modules. Each luminaire node in FIG. 2, for example, includes a controllable lamp (i.e., an actor unit), a controller, and, optionally, a sensor unit (e.g., ambient light sensor, occupancy sensor, etc.), although some luminaires might not include a sensor unit. Each sensor node in FIG. 2, for example includes a sensor unit and a controller, but not necessarily an actor unit (e.g., lamp, etc.). An illustrative configuration of sensor node 101-1 is described below and in regard to FIG. 5. As those who are skilled in the art will appreciate after reading this specification, different configurations of mesh nodes are possible, wherein each node is based on one or more of the components that are described below.

Sensor unit 401-$h$, wherein h has a value between 1 and H, inclusive, is an apparatus that comprises memory, processing components, and communication components, and is configured to gather information about the environment that is accessible by the sensor unit. Each sensor is configured to monitor a particular physical condition in well-known fashion (e.g., temperature, ambient light, humidity, occupancy, etc.). For example, sensor nodes 101-1, 101-3, and 101-5 comprise an ambient light sensor.

Each sensor unit is configured to report a state of the condition by providing input signals to controller 403, wherein the values of the input signals are representative of the states being reported. A given sensor unit 401-$h$ can report discrete input signal values and/or a continuum of states and can report states at particular times and/or continuously. A change in state, which is determined by controller 403 as described below, can occur based one or more sensor units detecting changes in the following, in any combination:
  i. environmental probes (e.g., temperature, ambient light, motion, infrared signature, humidity, etc.).
  ii. electrical inputs (i.e., binary, analog, bus), including from a switch.
  iii. signals received via radio (e.g., proximity beacons, etc.).
  iv. a state of the internal logic, woken up periodically based on time or on an external event.

For example and without limitation, a state change can correspond to a switch being actuated, occupancy being detected, a timer or counter reaching a predefined value, and so on.

Actor unit 402-$k$, wherein k has a value between 1 and K, inclusive, is an apparatus that comprises memory, processing components, and communication components, and is capable of doing something in the course of being affected by signals originating externally to the actor component, such as from controller 403, as described in detail below. Each actor unit acts upon its environment in well-known fashion.

Actor unit 402-$k$ is configured to receive, transmit, process, and/or relay signals conveying data, as well as being configured to affect a condition, physical or otherwise, in its environment, for example by generating a control signal. In accordance with the illustrative embodiment, actor unit 402-1 of each luminaire node 101-2, 101-4, and 101-6 is a lamp whose output is modifiable by controller logic executed by controller 403.

As those who are skilled in the art will appreciate after reading this disclosure, actor unit 402-$k$ can provide a different function than controlling a lamp to give light according to a configurable light output. For example and without limitation, the condition being affected can be:
  i. lighting, which can be adjusted (e.g., turning on or off, changing light output, changing brightness, changing color or mood, changing illuminance, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, fan speed, etc.).
  iv. an alert, which can be generated (e.g., of an email, of an SMS message, etc.).
  v. monitoring by a camera, which can be panned or tilted.
  vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).

viii. virtual keyboard navigation on virtual keyboard displayed by other device (e.g., video monitor, set-top box, etc.).
ix. control of shades/window coverings/blinds.
x. access control (e.g., unlocking/locking doors, opening/shutting doors, authorizing access to selected rooms or zones, etc.).

Furthermore, node 101-*m* can comprise any combination of and any number of actor functions. As those who are skilled in the art will appreciate, after reading this disclosure, node 101-*m* that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Controller 403 is a processing device, such as a microcontroller or microprocessor with a controller interface, which are well known in the art. For example and without limitation, the microcontroller can be part of an nRF52832 integrated circuit (IC) by Nordic Semiconductor, which is integrated with Bluetooth, or can be a SAM3X IC by Atmel Corporation. Controller 403 is configured such that, when operating in conjunction with the other components of node 101-1, controller 403 executes software, processes data, and telecommunicates according to the operations described herein, including those depicted in FIG. 10 which pertain to computing the angle of the location of a light source based on measuring light reflected by a surface illuminated by the light source.

Memory 404 is non-transitory and non-volatile computer storage memory technology that is well known in the art (e.g., flash memory, etc.). Memory 404 is configured to store an operating system, application software, and a database. The operating system is a collection of software that manages, in well-known fashion, node 101-1's hardware resources and provides common services for computer programs, such as those that constitute the application software. The application software that is executed by controller 403 according to the illustrative embodiment enables node 101-1 to perform the functions disclosed herein.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Communication interface 405 is configured to enable node 101-*m* to telecommunicate with other devices and systems, including other mesh network nodes, by receiving signals therefrom and/or transmitting signals thereto via receiver 421 and transmitter 422, respectively. Communication interface 405 communicates in accordance with Bluetooth mesh networking. In some other embodiments, communication interface 405 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on.

Receiver 421 is a component that enables node 101-*m* to telecommunicate with other components and systems by receiving signals that convey information therefrom and through antenna 423. It will be clear to those having ordinary skill in the art how to make and use alternative embodiments that comprise more than one receiver 421.

Transmitter 422 is a component that enables node 101-*m* to telecommunicate with other components and systems by transmitting signals that convey information thereto and through antenna 424. For example and without limitation, transmitter 422 is configured to transmit packets comprising the information described below and in FIGS. 6 through 10. It will be clear to those having ordinary skill in the art how to make and use alternative embodiments that comprise more than one transmitter 422.

In accordance with the illustrative embodiment, node 101-*m* uses communication interface 405 in order to telecommunicate wirelessly with external devices. It will clear to those skilled in the art, however, after reading the present disclosure, how to make use and use various embodiments of the present invention in which node 101-*m* communicates via a wired protocol (e.g., X10, KNX, etc.) over physical media (e.g., cable, wire, etc.) with one or more external devices, either in addition to or instead of the wireless capability provided by communication interface 405. In some embodiments of the present invention, communication interface 405 is implemented on hardware that is physically distinct from that of controller 403, while in some other embodiments communication interface 405 is implemented on the same hardware (IC) as controller 403.

In generating and transmitting one or more packets that convey a message within mesh network 200, along with including its own network address as the source address in the message, node 101-*m* is said to originate the message. As described below, node 101-*m* is further capable of forwarding a message that has been originated by a different node.

Figure 5:
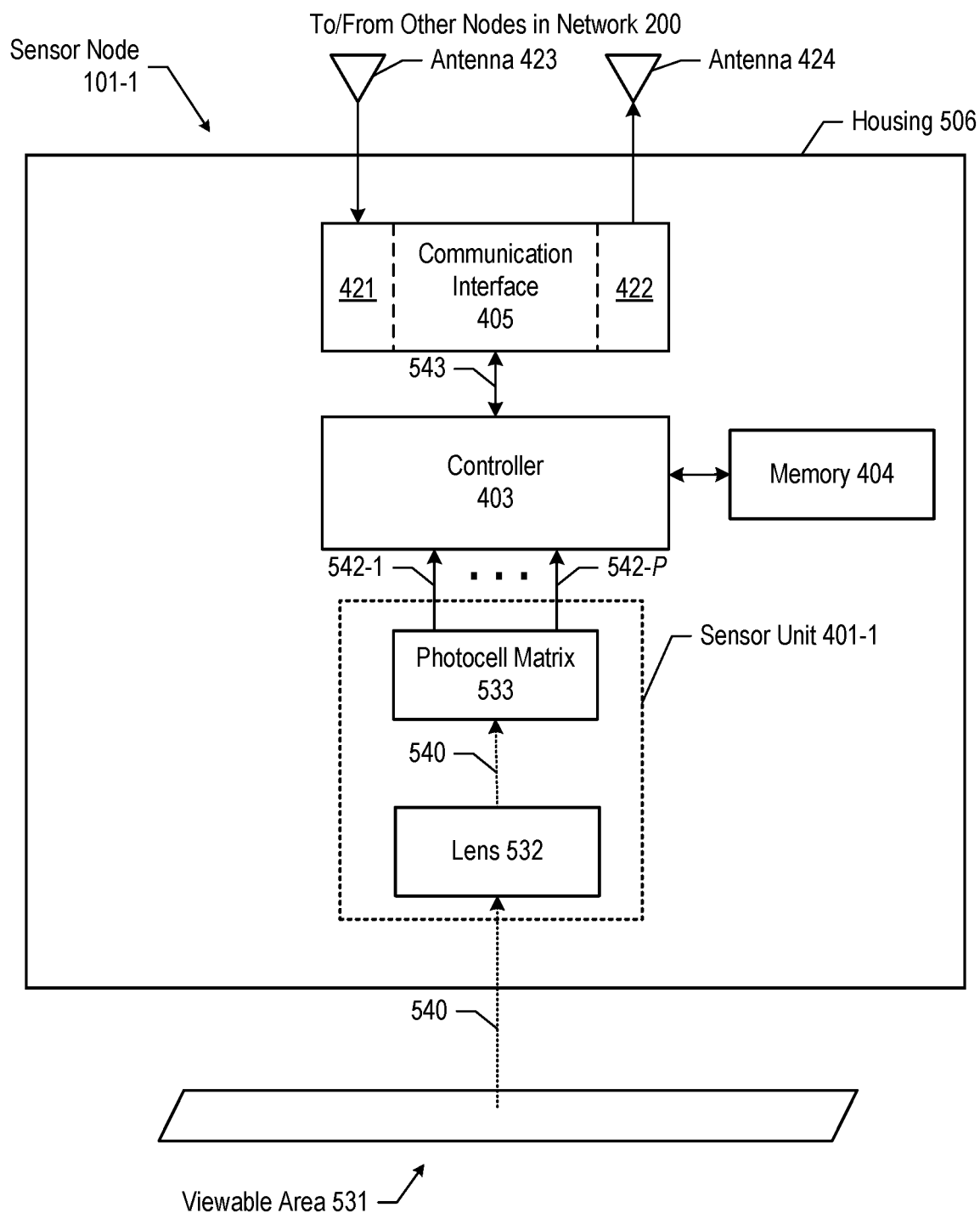
FIG. 5 depicts the salient components of sensor node 101-1 according to the illustrative embodiment.

FIG. 5 depicts the salient components of sensor node 101-1 according to the illustrative embodiment. Sensor node 101-1 comprises: sensor unit 401-1, controller 403, memory 404, communication interface 405, and housing 506, interrelated as shown. The foregoing components of sensor node 101-1 are described above and in regard to FIG. 4, and details specific to sensor node 101-1 are provided below.

Sensor unit 401-1 is an apparatus that comprises memory, processing components, and communication components, and is configured to gather information about the environment that is accessible by the sensor unit. Sensor unit 401-1 is configured to monitor a particular physical condition in well-known fashion in this case, light reflected off of viewable area 531. To this end, sensor unit 401-1 comprises lens 532 and photocell matrix 533. Lens 532 directs light rays 540 from viewable area 531 onto photocell matrix 533, which comprises P photocells, wherein P is a positive integer that is greater than one. The P photocells of matrix 533 provide illuminance signals, in the form of electrical signals, to controller 403 along respective signal paths 542-1 through 542-P, wherein the values or levels of the illuminance signals are representative of the light levels sensed by the photocells. Lens 532 and photocell matrix 533 are described below and in regard to FIG. 6.

Communication interface 405 is configured to enable node 101-1 to telecommunicate with other devices and systems, including other mesh network nodes, by receiving signals therefrom and/or transmitting signals thereto via receiver 421 and transmitter 422, respectively, an exchanging the signals with controller 403 via signal path 543.

Housing 506 contains sensor unit 401-1, controller 403, memory 404, and communication interface 405. It will be clear to those having ordinary skill in the art how to make and use housing 506.

Figure 6:
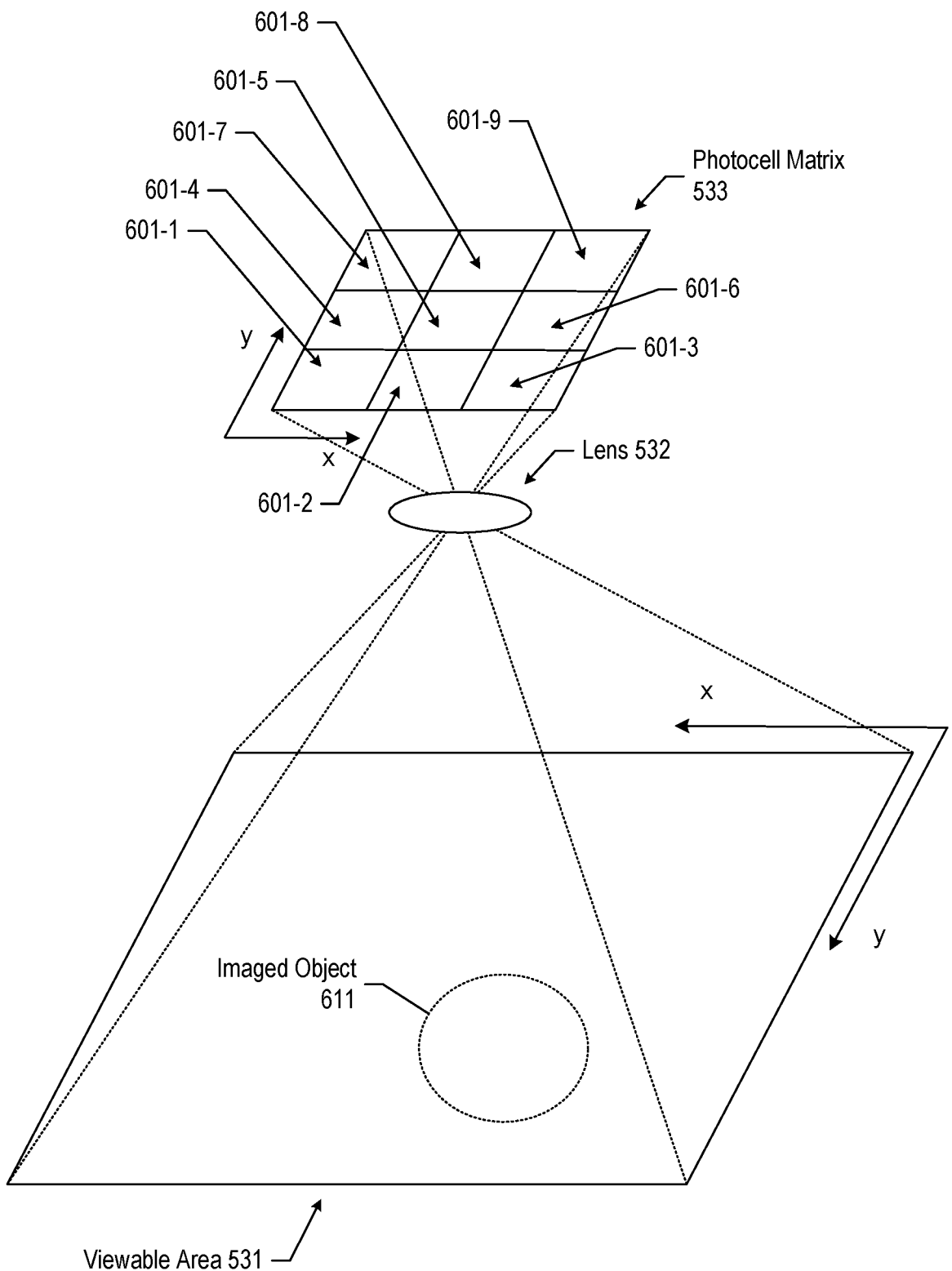
FIG. 6 depicts optical system 532 and photocell matrix 533 of sensor node 101-1.

FIG. 6 depicts optical system 532 and photocell matrix 533, which are included in sensor unit 401-1. Optical system 532, comprising a lens, directs light from viewable area 531 onto photocell matrix 533. In some embodiments of the present invention, optical system 532 is configured to direct the light so that the image from an imaged object 611 within viewable area 531 is out of focus on photocell matrix 533. In other words, optical system 532 acts as a low-pass filter on the image, having the effect of removing at least some high-frequency components of the image.

In some alternative embodiments of the present invention, optical system 532 utilizes something other than, or in addition to, a lens to direct the reflected light onto the photocell, such as an aperture or a focusing mirror.

Photocell matrix 533 is depicted as a two-dimensional matrix having photocells 601-1 through 601-P, wherein P has a value equal to 9 as depicted and wherein the photocells are situated in three rows and three columns in the matrix. Multiple photocells in matrix 533 are collectively referred to in this specification as "photocells 601." As those who are skilled in the art will appreciate after reading this specification, P can have a value different than 9 in some alternative embodiments of the present invention. Furthermore, the dimensioning of the matrix (i.e., number of rows and columns) can be different than depicted. The P photocells of photocell matrix 533 provide illuminance signals to controller 403 as depicted in FIG. 4.

The photocells of matrix 533 can be implemented with phototransistors, photoresistors, or an integrated chip, for example and without limitation. The photocell matrix can come as a prefabricated component, such as the OV9281 or OV9282 image sensors by OmniVision Technologies Inc., or can be created from discrete components as the TEMT6200FX01 phototransistor by Vishay Technology, Inc. or the LV0104CS photo IC by ON Semiconductor.

Viewable area 531 as depicted is the total area of one or more surfaces from which light (e.g., reflected light, etc.) is being directed by lens 532 to within the boundaries of photocell matrix 533. At least some of the x-y coordinate points within viewable area 531 map to corresponding x-y points within photocell matrix 533. For example, imaged object 611 might be sensed by one or more of photocells 601-4, 601-5, 601-7, and 601-8 as depicted, as a result of how lens 532 directs the viewable image onto the photocell matrix.

Figure 7:
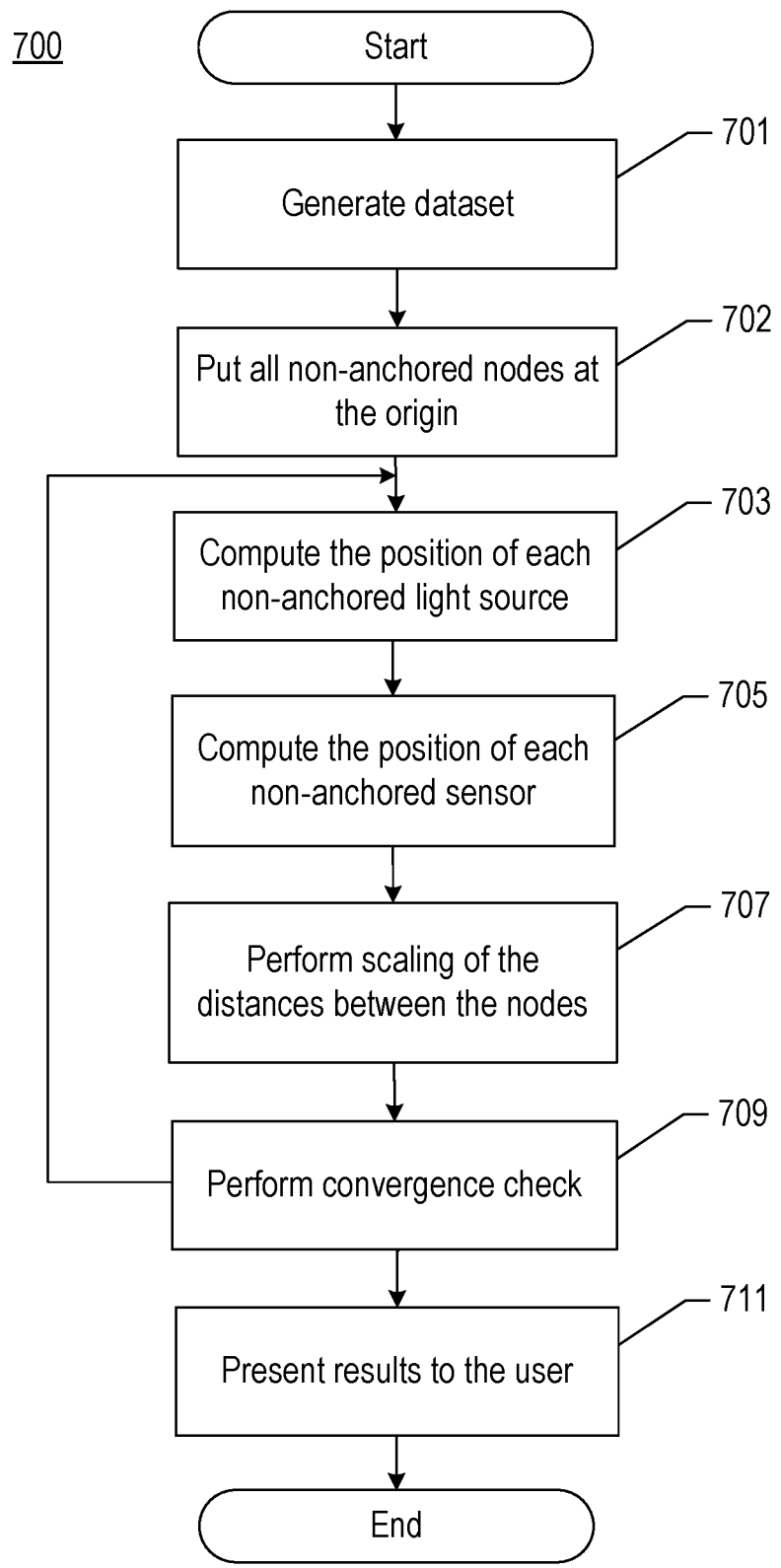
FIG. 7 depicts salient operations of method 700 according to the illustrative embodiment, by which wireless device 111 performs various functions that are related to discovering the topology of connected network 200.

Operations of Device 111 in Discovering the Topology of Connected Network 200: FIG. 7 depicts salient operations of method 700 according to the illustrative embodiment, by which wireless device 111 performs various functions that are related to discovering the topology of connected network 200, including the sensor nodes and luminaire nodes. For pedagogical purposes, method 700 is described in terms of discovering the topology of the three sensor nodes and the three luminaire nodes depicted in FIG. 2. It will clear to those skilled in the art, however, after reading this specification, how to extend the methods disclosed herein to any number of nodes and to any combination of the different types of nodes.

Figure 8A:
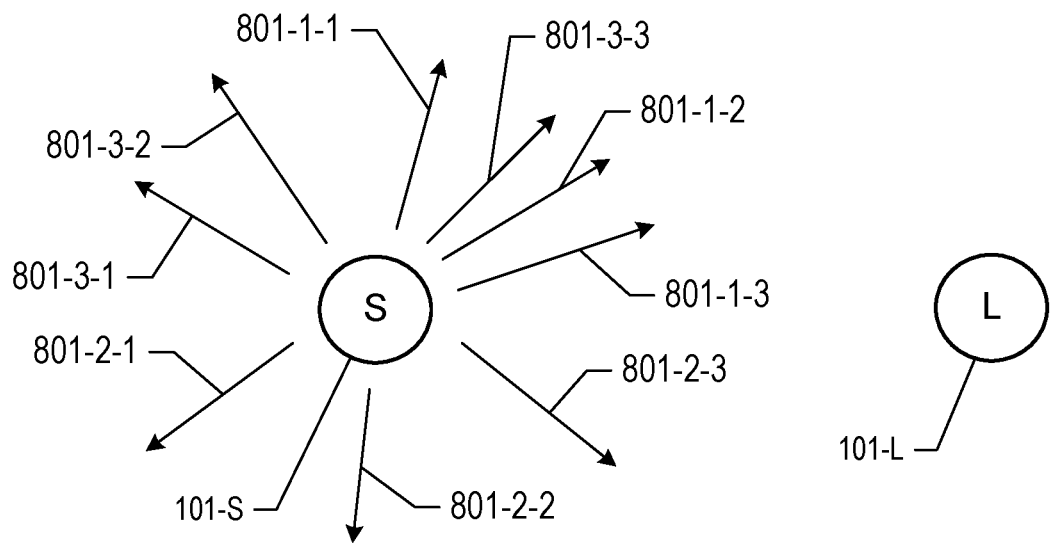
FIGS. 8A and 8B provide a graphical overview of the operations depicted in FIG. 7.
Figure 8B:
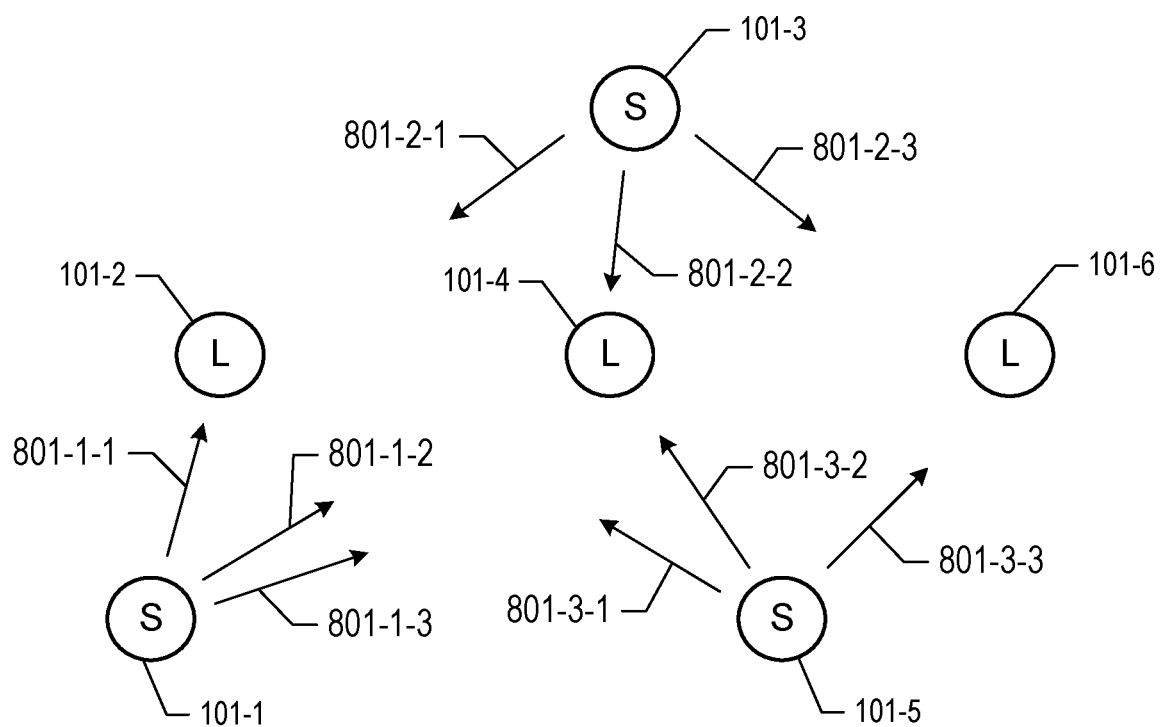

An overview of the operations disclosed herein is provided in FIGS. 8A and 8B. Wireless device 111 obtains the angular positions of the light sources with respect to the sensors, wherein the angular position is oriented within the x-y plane of viewable area 531 of FIG. 6. The angular positions of the light sources are illustrated in FIG. 8A, which shows three sensors 101-1, 101-3, and 101-5 and three light sources 101-2, 101-4, and 101-6 at their initial assumed locations. The three sensors are assumed to share the same location (i.e., at "101-S"), and the three light sources are assumed to share the same location (i.e., at "101-L").

FIGS. 8A and 8B also shows the angular positions, which are depicted as vectors, of various nodes with respect to other nodes. Angular positions 801-1-1, 801-1-2, and 801-1-3 correspond to the angular positions of respective light sources 101-2, 101-4, and 101-6 with respect to sensor 101-1. Angular positions 801-2-1, 801-2-2, and 801-2-3 correspond to the angular positions of respective light sources 101-2, 101-4, and 101-6 with respect to sensor 101-3. And angular positions 801-3-1, 801-3-2, and 801-3-3 correspond to the angular positions of respective light sources 101-2, 101-4, and 101-6 with respect to sensor 101-5. For purposes of clarity, the vectors toward the various sensors with respect to light sources 101-2, 101-4, and 101-6 are not shown. It will, however, be clear to those who are skilled in the art, after reading this specification, how to determine angular positions of the sensors with respect to the light sources.

Optionally, device 111 also obtains the location of selected light sources and sensors and/or the distances between selected light sources and sensors. The processing allows for inconsistent input data due to measurement errors of angles and distances.

In a number of iterations, wireless device 111 computes the locations of the light sources and the sensors. Device 111 stops the iterations if the accumulated shift in an iteration is below a threshold. The final computed locations of the sensors and light sources is illustrated in FIG. 8B, reflecting the physical positions of the same sensors and light sources depicted in FIG. 1 in building 100. FIG. 8B also shows the same angular positions that are depicted in FIG. 8A and remain consistent throughout the discovery process.

In regard to method 700, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

Furthermore, the indexing (i.e., "i", "j") that appears in the processing flowcharts herein is used in order to simplify the explanation of some of the processing that concurrently involves sensor nodes and light sources. The indexing is used instead of explicitly referring to each node by its reference numeral (e.g., "sensor node 101-1," "light source 101-2," etc.). For example, sensor nodes 1, 2, and 3 correspond to sensor nodes 101-1, 101-3, and 101-5, while light sources 1, 2, and 3 correspond to luminaires 101-2, 101-4, and 101-6.

In accordance with operation 701, wireless device 111 generates a dataset of input data to be used in the discovery process. In some embodiments of the present invention, device 111 initiates the discovery process depicted in FIG. 7 in response to receiving a command (e.g., from its user, from a different data-processing system, etc.) to discover the topology of network 200. Operation 701 is described in detail below and in regard to FIG. 9.

In accordance with operation 702, wireless device 111 initializes all non-anchored nodes to be spatially at an origin point.

In accordance with operation 703, wireless device 111 computes the spatial position of each non-anchored light source. A "non-anchored light source" is a luminaire node whose physical location (i.e., "anchored position") has not yet been determined. Operation 703 is described in detail below and in regard to FIG. 11.

In accordance with operation 705, wireless device 111 computes the spatial position of each non-anchored sensor. A "non-anchored sensor" is a sensor node whose physical location (i.e., "anchored position") has not yet been determined. Operation 705 is described in detail below and in regard to FIG. 13.

In accordance with operation 707, wireless device 111 scales the distance between the components (i.e., sensor nodes, luminaire nodes), if needed. Operation 707 is described in detail below and in regard to FIG. 15.

In accordance with operation 709, wireless device 111 performs a convergence check in order to determine whether to continue or stop the discovery process. Operation 709 is described in detail below and in regard to FIG. 16.

In accordance with operation 711, wireless device 111 presents at least some of the results of the discovery process to the user. For example and without limitation, device 111 can present any or all of the sensor node and/or light source spatial positions within the area discovered, their angular positions, or any part of the information provided by any or all of the sensor nodes, and/or any intermediate information disclosed herein. Device 111 can present any or all of this information on map (e.g., floor plan, etc.), in a list, or in any other format. Device 111 can store any or all of this information (e.g., in a configuration database, etc.). Moreover, device 111 can transmit any or all of the foregoing information to a different data-processing system, such as to a gateway, to a configuration database in the Cloud, and so forth, for various reasons (e.g., storage, processing, presentation to a user, etc.).

Figure 9A:
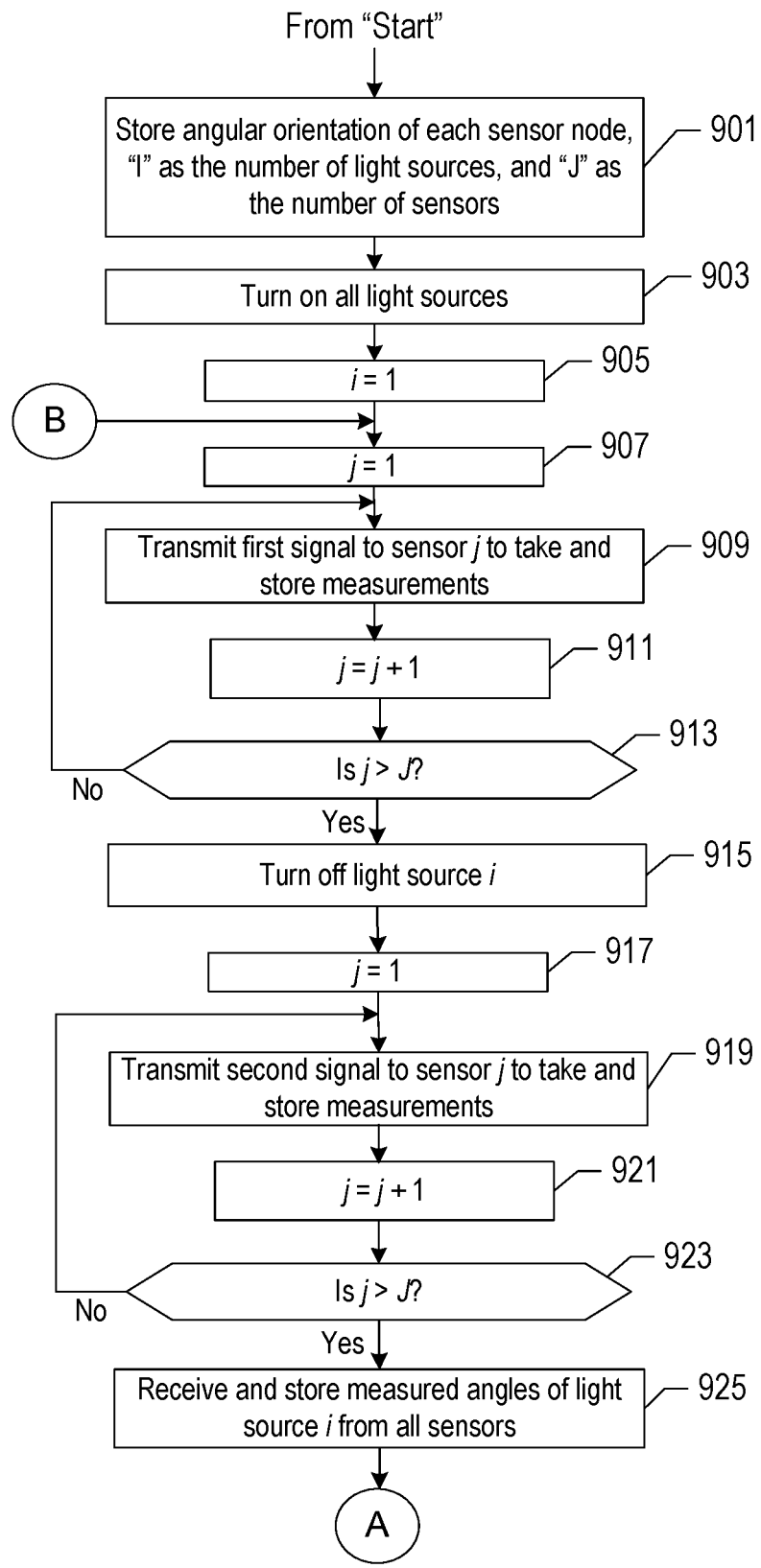
FIGS. 9A and 9B depict salient operations of method 701, by which wireless device 111 generates a dataset of input data to be used in the discovery process.
Figure 9B:
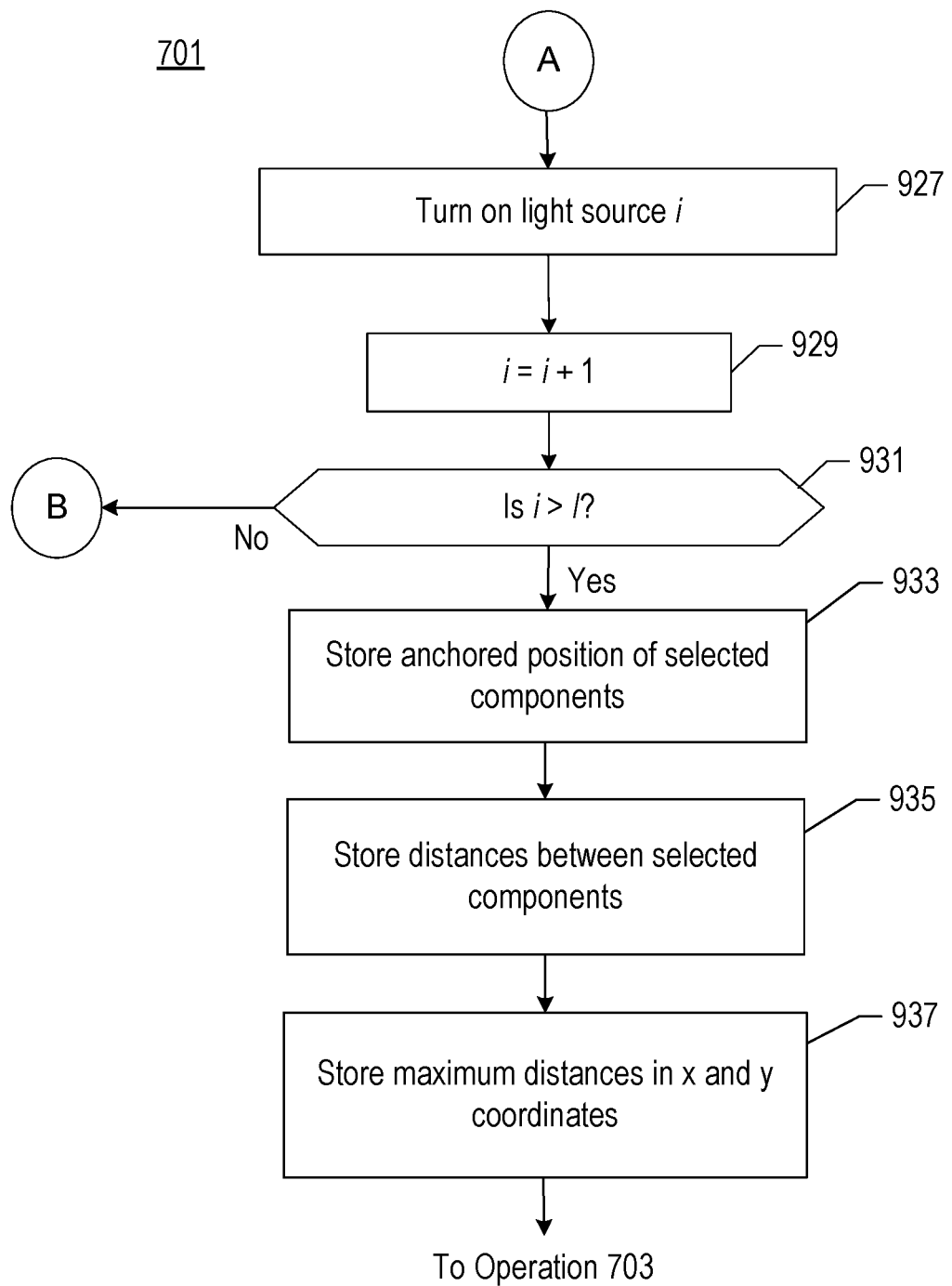

Operations in Generating a Data Set: FIGS. 9A and 9B depict salient operations of method 701 according to the illustrative embodiment, by which wireless device 111 generates a dataset of input data to be used in the discovery process. As there are three sensor nodes in the illustrative example (i.e., sensor nodes 101-1, 101-3, and 101-5), J has a value equal to 3. As there are three light sources (i.e., luminaire nodes 101-2, 101-4, and 101-6), I has a value equal to 3.

In accordance with the illustrative embodiment, each sensor node measures the angular positions of at least two light sources and each light source has its angular positions measured by the at least two sensor nodes. As those who are skilled in the art will appreciate after reading this specification, in some embodiments of the present invention not all of the angular positions of the light sources are measured by all of the sensor nodes.

In the explanation below, the sequence in which the light is measured is based on the lighting being first on, then off. As those who are skilled in the art will appreciate after reading this specification, in some embodiments of the present invention the sequence of lighting measurements can be performed instead as first off, then on. In other words, operation 903 can involve turning off all light sources and operation 915 can involve turning on light source i, followed by operation 927 resetting light source i by turning it off.

In accordance with operation 901 in FIG. 9A, wireless device 111 stores the angular orientation of each sensor node. The angular orientation is known because of the way that the sensor node is originally installed physically in building 100. For example and without limitation, the angular orientation of a sensor node can be defined with respect to the x-y plane of an area (e.g., a room, etc.) within building 100. The angular orientation information for each sensor node enables positions to be referenced with respect to the plane of the area being discovered, rather than with respect to each individual sensor node.

Wireless device 111 also sets "I" as being equal to the number of light sources and "J" as being equal to the number of sensors.

In accordance with operation 903, wireless device 111 transmits a signal to all of the light sources to turn on (i.e., to emit light). The indices i and j are initialized at operations 905 and 907, respectively.

In accordance with operation 909, wireless device 111 transmits a first signal to sensor node j to make measurements. The operations performed by sensor node j are described below and in FIG. 10.

In accordance with operation 913, if all J sensor nodes have been queried in regard to light source i, control of task execution proceeds to operation 915. Otherwise, control of execution proceeds back to operation 909.

In accordance with operation 915, wireless device 111 transmits a signal to light source i to turn off (i.e., to stop emitting light). The index j is then re-initialized at operation 917.

In accordance with operation 919, wireless device 111 transmits a second signal to sensor node j to make measurements.

In accordance with operation 923, if all J sensor nodes have been queried in regard to light source i, control of task execution proceeds to operation 925. Otherwise, control of execution proceeds back to operation 919.

In accordance with operation 925, wireless device 111 receives and stores the angular position (e.g., 291 degrees, etc.) of light source i from each of sensors 1 through J.

In accordance with operation 927 in FIG. 9B, wireless device 111 transmits a signal to light source i to turn on.

In accordance with operation 931, if angular positions for all I light sources have been obtained, control of task execution proceeds to operation 933. Otherwise, control of execution proceeds back to operation 907.

In accordance with operation 933, wireless device 111 optionally stores the anchored spatial positions (e.g., x=500 units, y=300 units, etc.) of selected components that is, of sensor nodes and/or light sources.

In accordance with operation 935, wireless device 111 optionally stores the distances (e.g., 70 units, etc.) between selected pairs of components.

In accordance with operation 937, wireless device 111 in some embodiments stores the maximum distances in x and y coordinates for the set of nodes being discovered. For example, this information is needed if the anchored spatial positions for less than two components are known.

After operation 937, control of task execution proceeds to operation 703.

Figure 10:
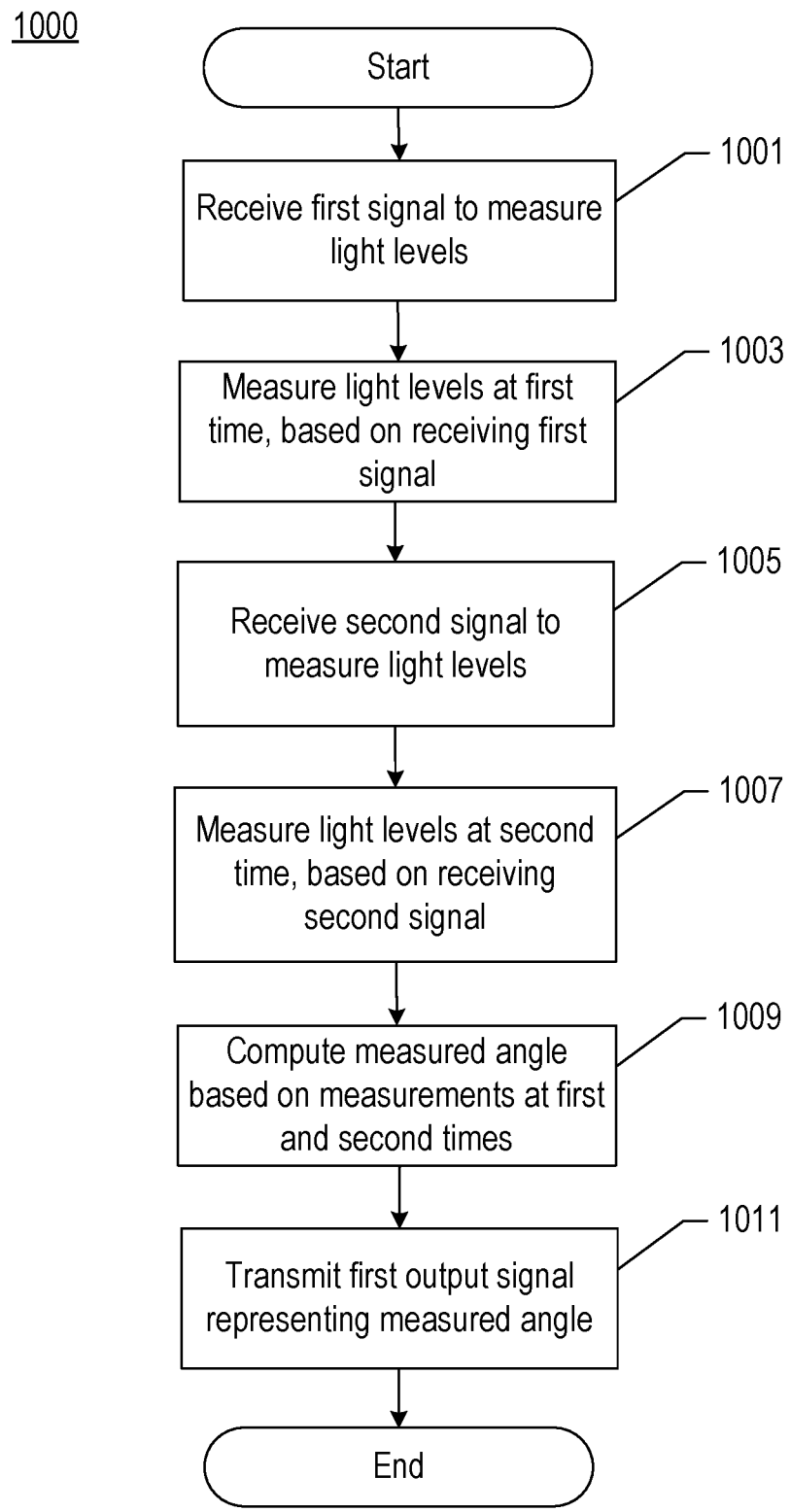
FIG. 10 depicts salient operations of method 1000, by which sensor node 101-1 measures and provides an angular position of a light source in relation to the sensor node.

Operation in Determining an Angular Position of a Light Source with Respect to a Sensor Node: FIG. 10 depicts salient operations of method 1000 according to the illustrative embodiment, by which sensor node 101-1 generates and provides a measurement of a light source in relation to the sensor node, wherein the sensor node generates the measurement based on one or more individual measurements (e.g., of light level, etc.) that it makes.

In accordance with the illustrative embodiment, the measurement that sensor node 101-1 provides is that of an angular position of a light source in relation to the sensor node. As those who are skilled in the art will appreciate after reading this specification, in some alternative embodiments of the present invention the measurement that sensor node 101-1 provides is that of a different characteristic (e.g., location, etc.) of a light source in relation to the sensor node.

In accordance with operation 1001, sensor node 101-1 receives a first signal, which corresponds to the signal transmitted by wireless device 111 in accordance with operation 909.

In accordance with operation 1003, and in response to receiving the first signal, sensor node 101-1 measures light levels sensed by at least three photocells 601 in photocell matrix 533 at a first time, which can be a point in time or part of a finite interval of time. For instance, the measuring occurs when light source i is on at the first time. The measuring results in a plurality of first measurements. The first measurements are made from illuminance signals that represent the light levels sensed by photocells 601 at the first time, and wherein the three photocells are arranged such that at least two photocells are along each of a first dimension and a second dimension of the photocell matrix.

In accordance with the illustrative embodiment, the measured values are generated in accordance with the following equations:

$$BX_{LEFT-T1}=\log(X_{LEFT-T1}), \quad \text{(Eq. 1)}$$

$$BX_{RIGHT-T1}=\log(X_{RIGHT-T1}), \quad \text{(Eq. 2)}$$

$$BY_{DOWN-T1}=\log(Y_{DOWN-T1}), \text{and} \quad \text{(Eq. 3)}$$

$$BY_{UP-T1}=\log(Y_{UP-T1}), \quad \text{(Eq. 4)}$$

wherein:
$X_{LEFT-T1}$ is a measurement made at a first time from illuminance signals comprising those received from at least one of photocells 601-1, 601-4, and 601-7.
$X_{RIGHT-T1}$ is a measurement made at a first time from illuminance signals comprising those received from at least one of photocells 601-3, 601-6, and 601-9.
$Y_{DOWN-T1}$ is a measurement made at a first time from illuminance signals comprising those received from at least one of photocells 601-1, 601-2, and 601-3.
$Y_{UP-T1}$ is a measurement made at a first time from illuminance signals comprising those received from at least one of photocells 601-7, 601-8, and 601-9.
$BX_{LEFT-T1}$, $BX_{RIGHT-T1}$, $BY_{DOWN-T1}$, and $BY_{UP-T1}$ are the logarithmic values of $X_{LEFT-T1}$, $X_{RIGHT-T1}$, $Y_{DOWN-T1}$, and $Y_{UP-T1}$, respectively.

Sensor node 101-1 performs at least some of the measurement processing in the log domain, in order to reduce errors. As those who are skilled in the art will appreciate after reading this specification, in some embodiments of the present invention the measurements can be preserved and processed in the linear domain instead.

As those who are skilled in the art will appreciate after reading this specification, measurements from more than one photocell can be combined (e.g., averaged, etc.) in order to form a representative measurement of a given direction (i.e., $X_{LEFT}$, $X_{RIGHT}$, $Y_{DOWN}$, $Y_{UP}$). In some embodiments of the present invention, measurements from only an interior portion of photocells 601 in photocell matrix 533 are used. In other words, photocells 601-1 through 601-9 might actually be the interior portion of photocells, wherein at least one or more lines of photocells might border one or more of photocells 601-1 through 601-9 on their exterior.

In accordance with operation 1005, sensor node 101-1 receives a second signal, which corresponds to the signal transmitted by wireless device 111 in accordance with operation 919.

In accordance with operation 1007, and in response to receiving the second signal, sensor node 101-1 measures light levels sensed by at least three photocells 601 in photocell matrix 533 at a second time, which can be a point in time or part of a finite interval of time. For instance, the measuring occurs when light source i is off at the second time. The measuring results in a plurality of second measurements. The second measurements are made from illuminance signals that represent the light levels sensed by photocells 601 at the second time. The first and second times are different from each other.

In accordance with the illustrative embodiment, the measured values are generated in accordance with the following equations:

$$BX_{LEFT-T2}=\log(X_{LEFT-T2}), \quad \text{(Eq. 5)}$$

$$BX_{RIGHT-T2}=\log(X_{RIGHT-T2}), \quad \text{(Eq. 6)}$$

$$BY_{DOWN-T2}=\log(Y_{DOWN-T2}), \text{and} \quad \text{(Eq. 7)}$$

$$BY_{UP-T2}=\log(Y_{UP-T2}), \quad \text{(Eq. 8)}$$

wherein:
$X_{LEFT-T2}$ is a measurement made at a second time from illuminance signals comprising those received from at least one of photocells 601-1, 601-4, and 601-7.
$X_{RIGHT-T2}$ is a measurement made at a second time from illuminance signals comprising those received from at least one of photocells 601-3, 601-6, and 601-9.
$Y_{DOWN-T2}$ is a measurement made at a second time from illuminance signals comprising those received from at least one of photocells 601-1, 601-2, and 601-3.
$Y_{UP-T2}$ is a measurement made at a first second from illuminance signals comprising those received from at least one of photocells 601-7, 601-8, and 601-9.
$BX_{LEFT-T2}$, $BX_{RIGHT-T2}$, $BY_{DOWN-T2}$, and $BY_{UP-T2}$ are the logarithmic values of $X_{LEFT-T2}$, $X_{RIGHT-T2}$, $Y_{DOWN-T2}$, and $Y_{UP-T2}$, respectively.

In some alternative embodiments of the present invention, sensor node 101-1 measures the light levels at the second time based on a timer instead of based on receiving the second signal. For instance, the timer can either be provided by wireless device 111 (e.g., in the first signal, etc.) or can be hardcoded in the sensor node with a value that is sufficient to ensure that the two sets of measurements (i.e., first measurements and second measurements) occur under different light conditions (i.e., light turned on and light turned off).

In accordance with operation 1009, sensor node 101-1 computes a first measured angle (e.g., a direction angle, etc.) across the first and second dimensions from a first difference between at least one of the first measurements made in accordance with operation 1003 and at least one of the second measurements made in accordance with operation 1007.

In accordance with the illustrative embodiment, the first difference and other differences are generated in accordance with the following equations:

$$dX_{LEFT}=BX_{LEFT-T2}-BX^{LEFT-T1}, \quad \text{(Eq. 9)}$$

$$dX_{RIGHT}=BX_{RIGHT-T2}-BX_{RIGHT-T1}, \quad \text{(Eq. 10)}$$

$$dY_{DOWN}=BY_{DOWN-T2}-BY_{DOWN-T1}, \text{and} \quad \text{(Eq. 11)}$$

$$dY_{UP}=BY_{UP-T2}-BY_{UP-T1}. \quad \text{(Eq. 12)}$$

The first angle is generated in accordance with the following equation:

$$\text{Angle} = \arctan((dY_{UP} - dY_{DOWN})/(dX_{RIGHT} - dX_{LEFT})). \quad \text{(Eq. 13)}$$

In accordance with operation 1011, sensor node 101-1 transmits a first output signal that represents the first measured angle.

Figure 11:
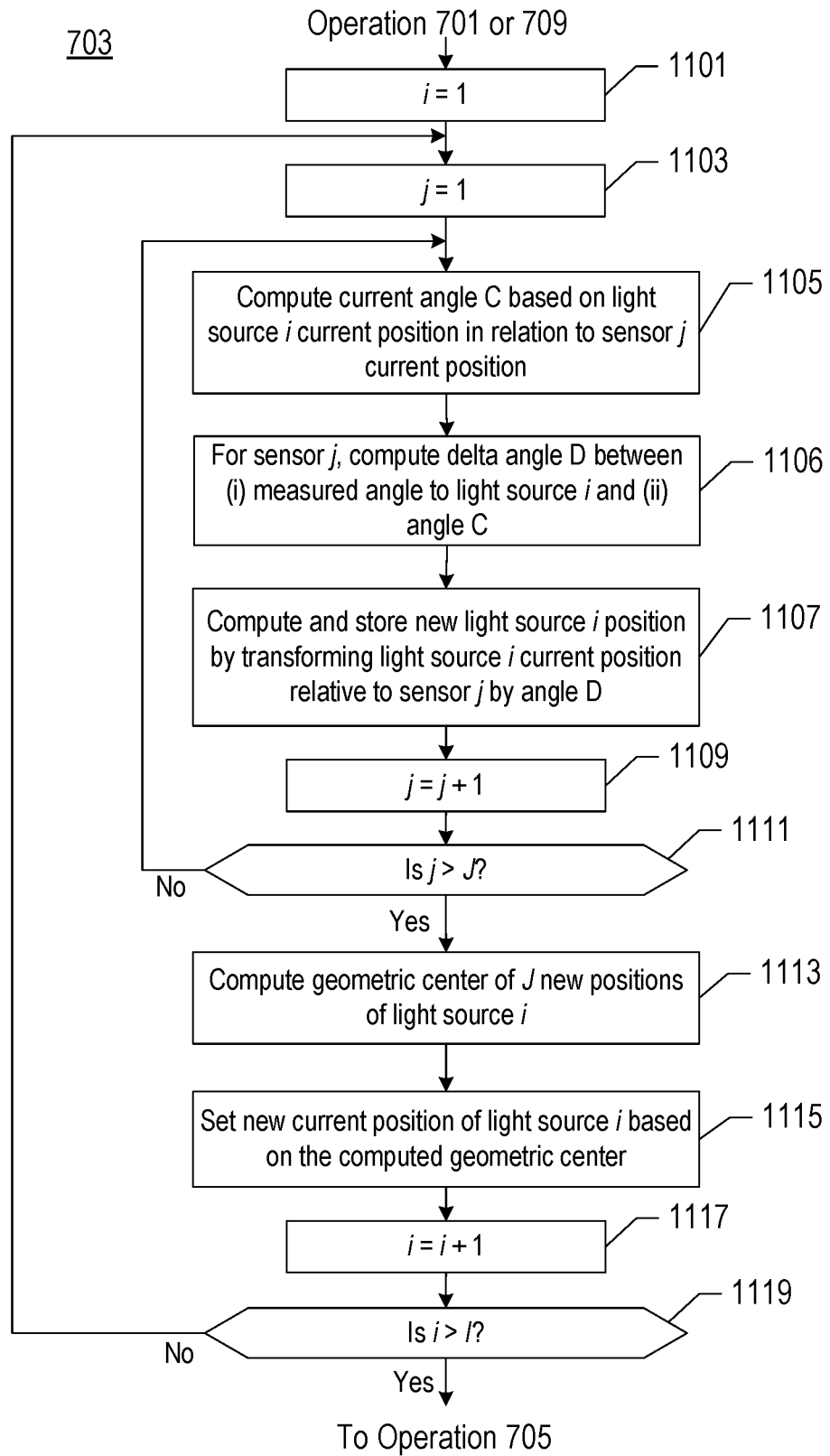
FIG. 11 depicts salient operations of method 703, by which wireless device 111 computes the spatial position of each non-anchored light source.

Operations in Computing the Spatial position of Each Non-Anchored Light Source: FIG. 11 depicts salient operations of method 703 according to the illustrative embodiment, by which wireless device 111 computes the spatial position of each non-anchored light source.

In accordance with operations 1101 and 1103, wireless device 111 initializes counters i and j.

Figure 12:
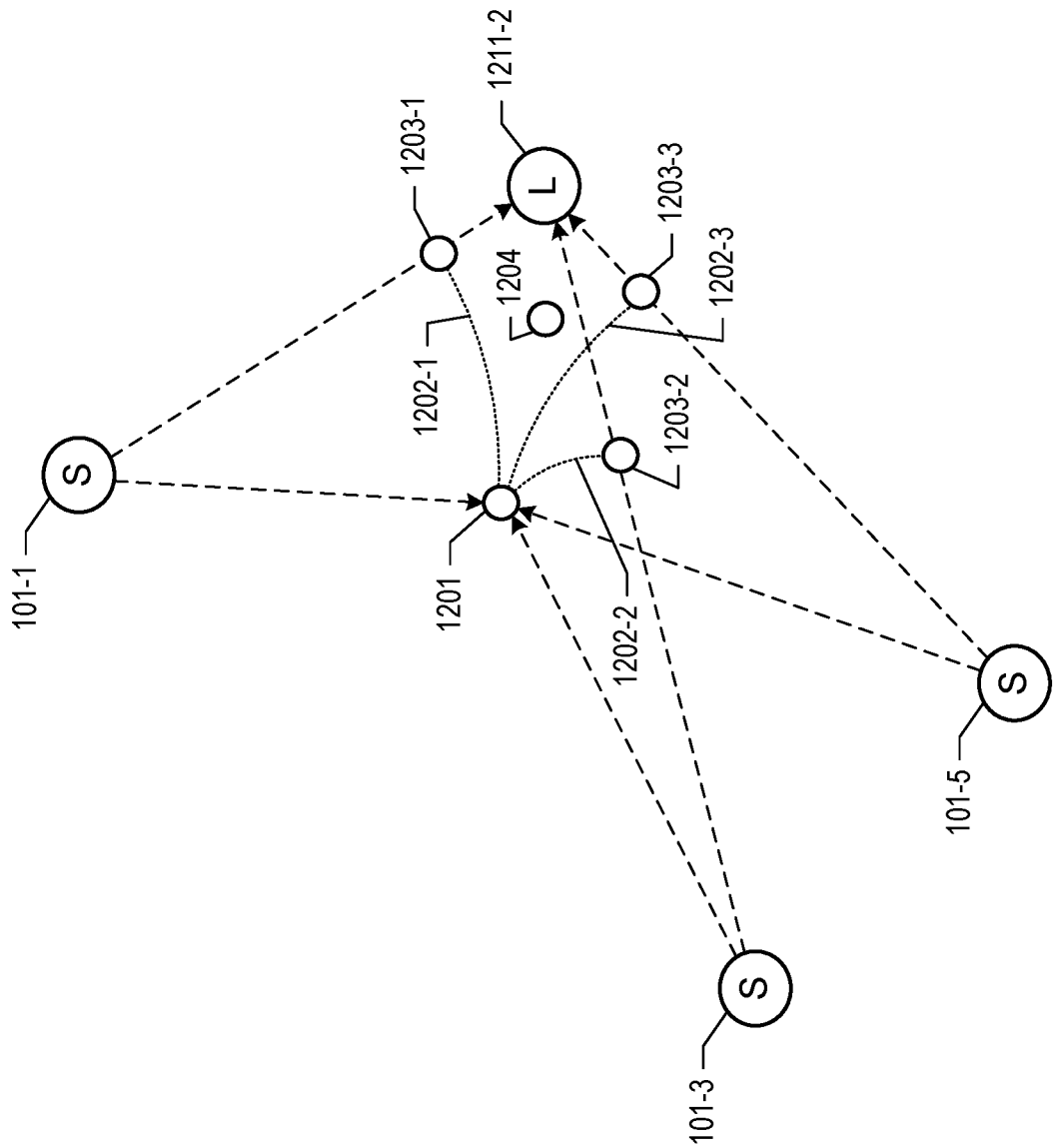
FIG. 12 provides a graphical depiction of at least some of the operations in FIG. 11.

In accordance with operation 1105, wireless device 111 computes current angle C (e.g., a direction angle, etc.) of the direction toward the current position of light source i in relation to the current position of sensor j. As depicted in FIG. 12, the current position of light source i is at spatial position 1201, and the current positions of sensor nodes 101-1, 101-3, and 101-5 are also depicted.

In accordance with operation 1106, and referring to FIG. 12, wireless device 111 computes the delta angle D between (i) the measured angle of the direction toward non-anchored light source i from sensor node j, obtained in accordance with operation 701, and (ii) current angle C that is computed in accordance with operation 1105. The measured angle points in the direction (i.e., defines the direction) from sensor node j to non-anchored light source i at aim position 1211-2. As depicted, the delta angles from the perspective of sensor nodes 101-1, 101-3, and 101-5 are delta angles 1202-1, 1202-2, and 1202-3, respectively.

In accordance with operation 1107, wireless device 111 generates an estimate of the position resulting by moving light source i by the delta angle computed in accordance with operation 1106. As depicted, these estimates of position of light source i as they correspond to sensor nodes 101-1, 101-3, and 101-5 are position estimates 1203-1, 1203-2, and 1203-3, respectively.

In accordance with operation 1113, if all sensor nodes have been considered, wireless device 111 generates updated light source position 1204 of light source i based on one or more of the estimates of position generated in accordance with operation 1107. Otherwise, control of task execution proceeds back to operation 1105 to process the next sensor node.

In some embodiments of the present invention, the estimates of position define the vertices of a first polygon, and the updated light source position is defined by the geometric center, or centroid, of the first polygon (e.g., the light source is placed at, or near, the geometric center, etc.). As those who are skilled in the art will appreciate after reading this specification, the updated light source position can be placed at, or near, a different type of center (e.g., circumcenter, incenter, orthocenter, N-point center, etc.)

In accordance with operation 1115, wireless device 111 moves the position of light source i to the updated light source position generated in accordance with operation 1113. In other words, the updated light source position of light source i for the current iteration of processing becomes the current light source position of light source i for the next iteration of processing. In some embodiments of the present invention, if all sensor nodes and light source i have the same position (e.g., in the initial iteration, etc.), light source i is moved away (e.g., by one unit) in the direction indicated by any sensor node.

If all light sources have been considered, control of task execution proceeds to operation 705. Otherwise, control of task execution proceeds back to operation 1103 to process the next light source.

Figure 13:
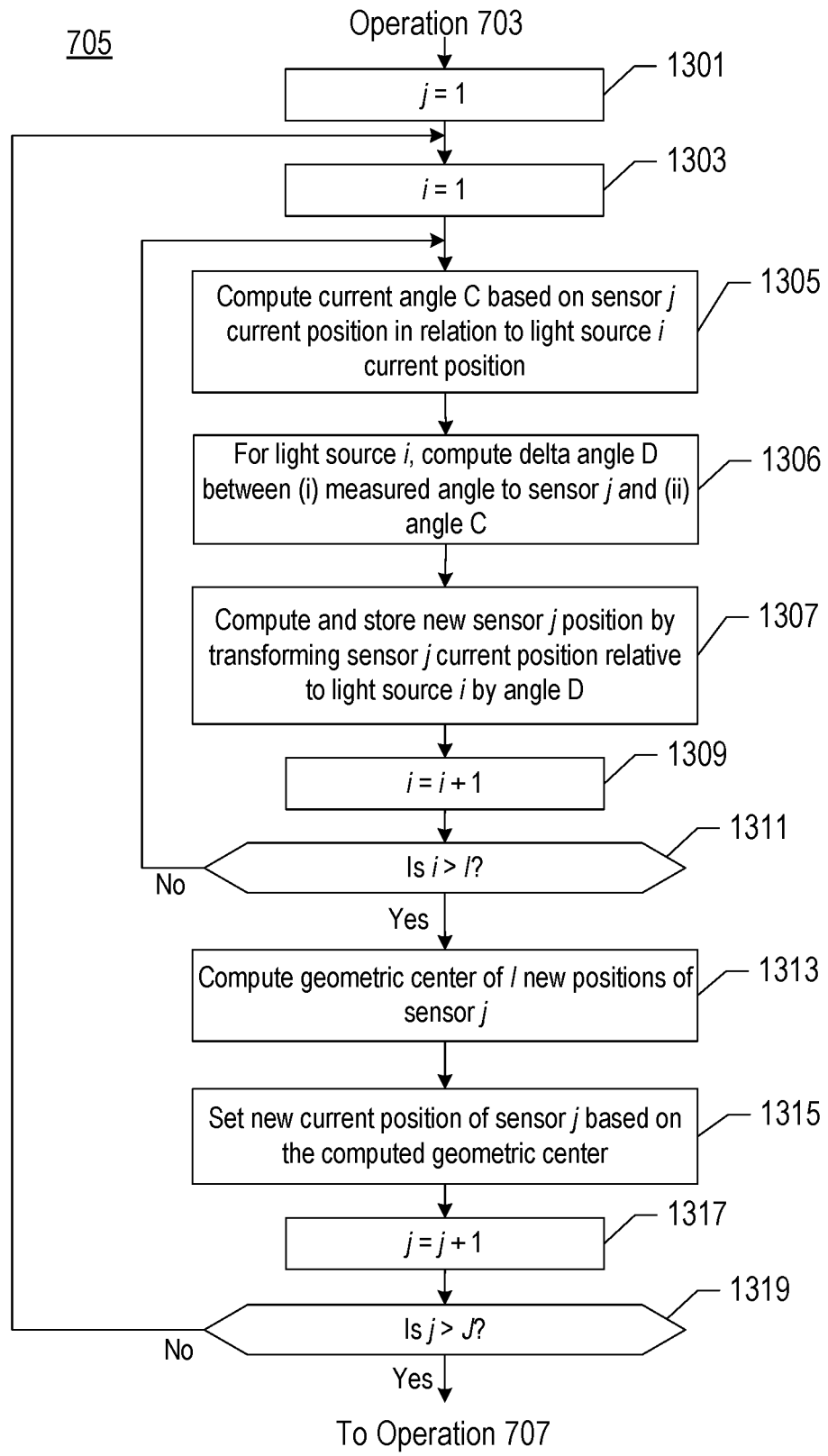
FIG. 13 depicts salient operations of method 705, by which wireless device 111 computes the spatial position of each non-anchored sensor node.

Operations in Computing the Spatial position of Each Non-Anchored Sensor Node: FIG. 13 depicts salient operations of method 705 according to the illustrative embodiment, by which wireless device 111 computes the spatial position of each non-anchored sensor node.

In accordance with operations 1301 and 1303, wireless device 111 initializes counters i and j.

Figure 14:
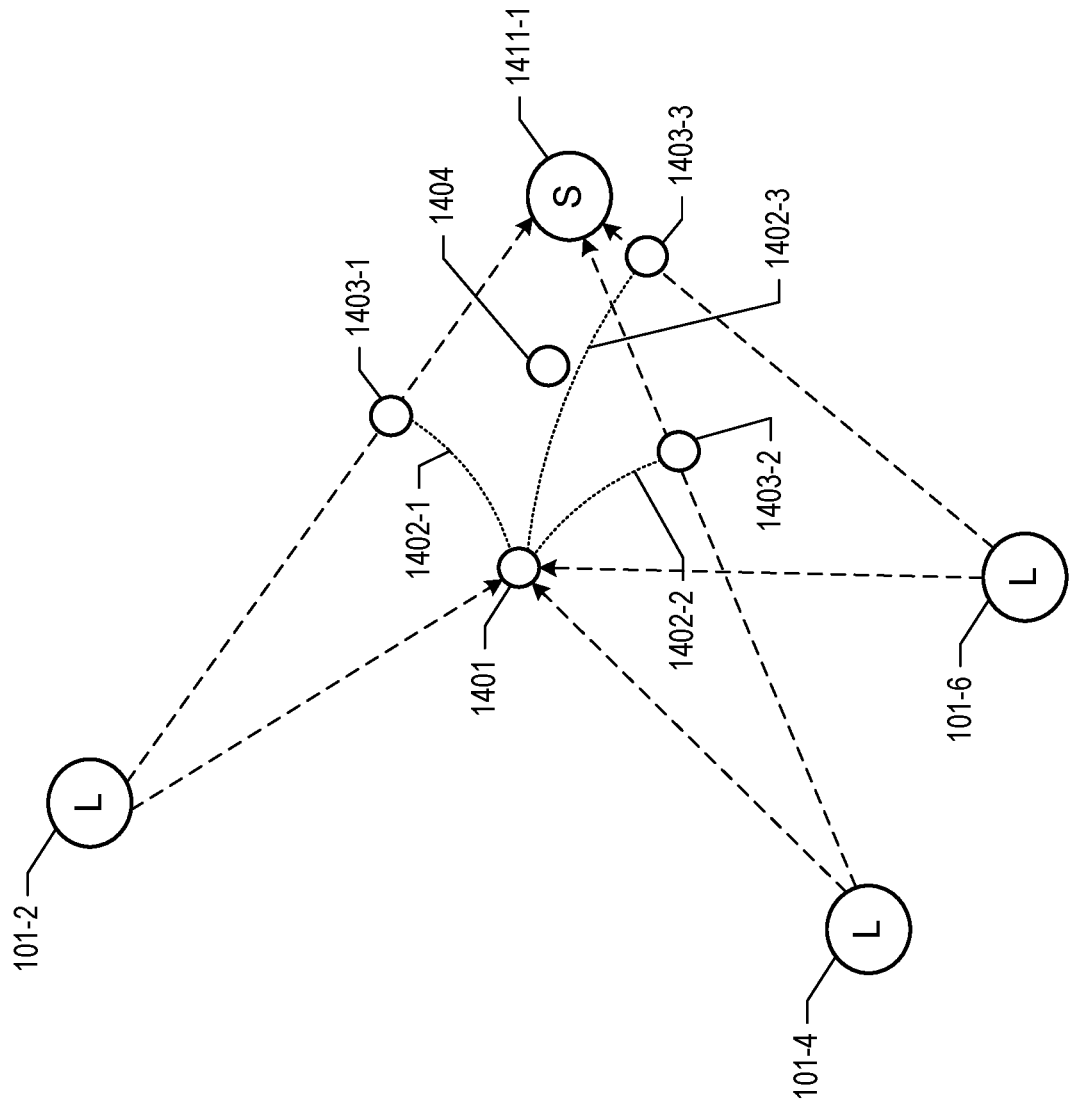
FIG. 14 provides a graphical depiction of at least some of the operations in FIG. 13.

In accordance with operation 1305, wireless device 111 computes current angle C (e.g., a direction angle, etc.) of the direction toward the current position of sensor j in relation to the current position of light source i. As depicted in FIG. 14, the current position of sensor j is at spatial position 1401, and the current positions of light sources 101-2, 101-4, and 101-6 are also depicted.

In accordance with operation 1306, and referring to FIG. 14, wireless device 111 computes the delta angle D between (i) the measured angle of the direction toward non-anchored sensor node j from light source i, obtained in accordance with operation 701, and (ii) current angle C that is computed in accordance with operation 1305. The measured angle points in the direction (i.e., defines the direction) from light source i to non-anchored sensor node j at aim position 1411-1. As depicted, the delta angles from the perspective of light sources 101-2, 101-4, and 101-6 are delta angles 1402-1, 1402-2, and 1402-3, respectively.

In accordance with operation 1307, wireless device 111 generates an estimate of the position resulting by moving sensor node j by the delta angle computed in accordance with operation 1306. As depicted, these estimates of position of sensor node j as they correspond to light sources 101-2, 101-4, and 101-6 are position estimates 1403-1, 1403-2, and 1403-3, respectively.

In accordance with operation 1313, if all light sources have been considered, wireless device 111 generates updated sensor node position 1404 of sensor node j based on one or more of the estimates of position generated in accordance with operation 1307. Otherwise, control of task execution proceeds back to operation 1305 to process the next light source.

In some embodiments of the present invention, the estimates of position define the vertices of a first polygon, and the updated sensor node position is defined by the geometric center, or centroid, of the first polygon (e.g., the sensor node is placed at, or near, the geometric center, etc.). As those who are skilled in the art will appreciate after reading this specification, the updated sensor node position can be placed at, or near, a different type of center (e.g., circumcenter, incenter, orthocenter, N-point center, etc.)

In accordance with operation 1315, wireless device 111 moves the position of sensor node j to the updated sensor node position generated in accordance with operation 1313. In other words, the updated sensor node position of sensor node j for the current iteration of processing becomes the current sensor node position of sensor node j for the next iteration of processing.

If all sensor nodes have been considered, control of task execution proceeds to operation 707. Otherwise, control of task execution proceeds back to operation 1303 to process the next sensor node.

Figure 15:
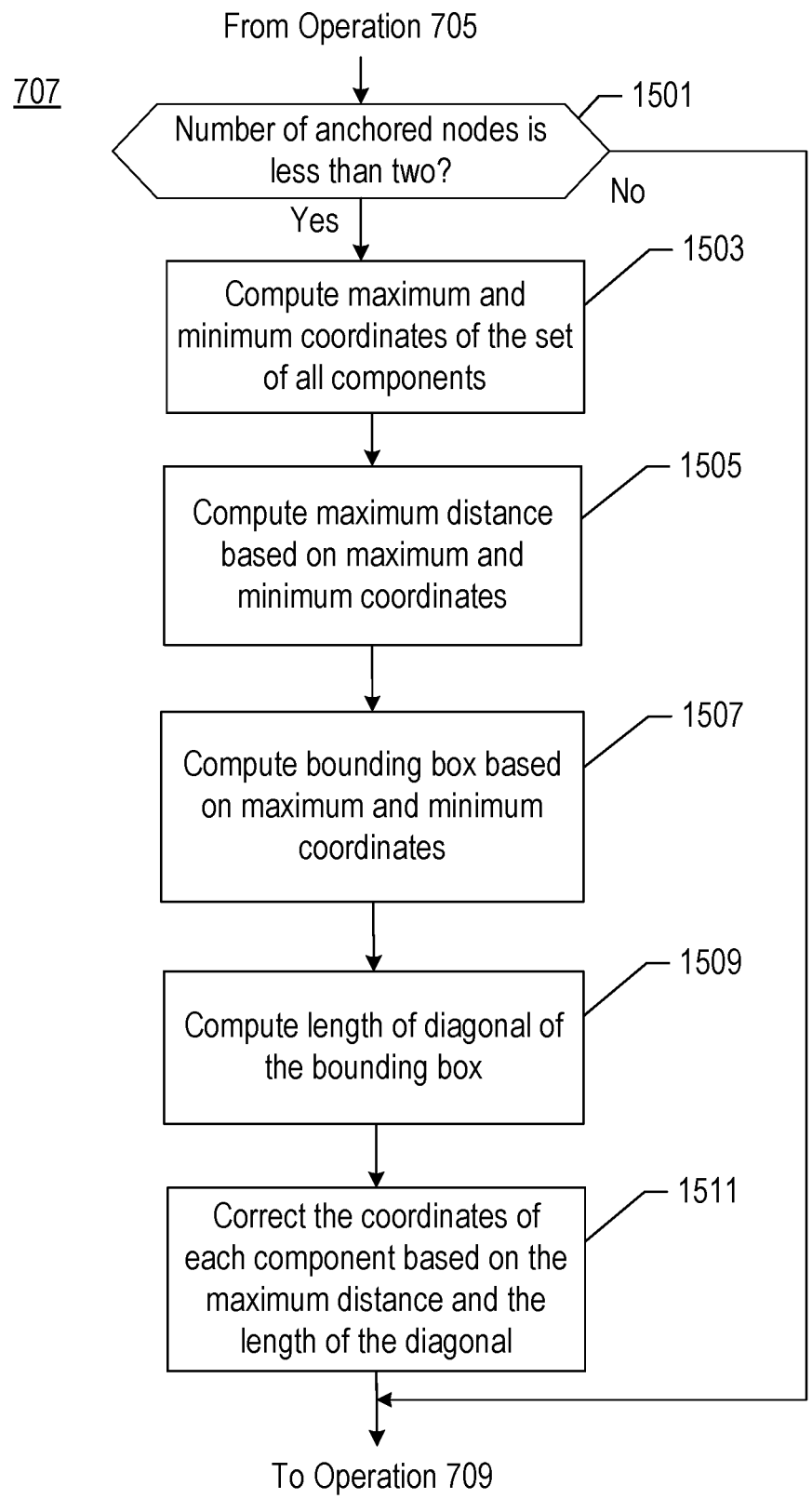
FIG. 15 depicts salient operations of method 707, by which wireless device 111 scales the distances between the components.

Operations in Scaling the Distances Between the Nodes: FIG. 15 depicts salient operations of method 707 according to the illustrative embodiment, by which wireless device 111 scales the distances between the components (i.e., sensor nodes and light sources).

In accordance with operation 1501, if there are fewer than two components that are anchored (i.e., their locations are known ahead of the discovery process), control of task execution proceeds to operation 1503. Otherwise, control of task execution proceeds to operation 709.

In accordance with operation 1503, wireless device 111 computes the maximum and minimum X and Y coordinates of the set of all of the components, which are referred to as $X_{MAX}$, $X_{MIN}$, $Y_{MAX}$, $Y_{MIN}$.

In accordance with operation 1505, wireless device 111 computes a maximum size, $S_{MAX}$, of the component layout based on the maximum and minimum coordinates of the set of all of the components, according to the equation:

$$S_{MAX} = \text{Max}(X_{MAX} - X_{MIN}, Y_{MAX} - Y_{MIN}). \qquad \text{(Eq. 14)}$$

In accordance with operation 1506, wireless device 111 determines the minimum X and Y and maximum X and Y coordinates, (XRealMin, YRealMin, XRealMax, YReal-Max), of a rectangle in which a second polygon is inscribed, wherein the second polygon itself is defined by the topology of the sensor nodes and light source components as the vertices of the polygon. The rectangle is also referred to as a "minimum bounding box." In some embodiments of the present invention, the bounding box is an axis-aligned minimum bounding box.

In accordance with operation 1509, wireless device 111 computes the real maximum size, $R_{MAX}$, of the component layout, accounting for a floor plan with real distances, according to the equation:

$$R_{MAX} = \text{distance}((X\text{RealMin}, Y\text{RealMin}), (X\text{RealMax}, Y\text{RealMax})), \qquad \text{(Eq. 15)}$$

wherein:
  $R_{MAX}$ is the length of the diagonal of the rectangle described above in which the second polygon is inscribed.

In accordance with operation 1511, wireless device 111 adjusts the position coordinates of the components, according to the equations:

$$X = (x - X_{MIN}) * R_{MAX} / S_{MAX}, \text{ and} \qquad \text{(Eq. 16)}$$

$$Y = (y - Y_{MAX}) * R_{MAX} / S_{MAX}, \text{ and} \qquad \text{(Eq. 17)}$$

wherein:
  X and Y are the corrected coordinates of uncorrected coordinate pair (x,y).

Control of task execution then proceeds to operation 709.

Figure 16:
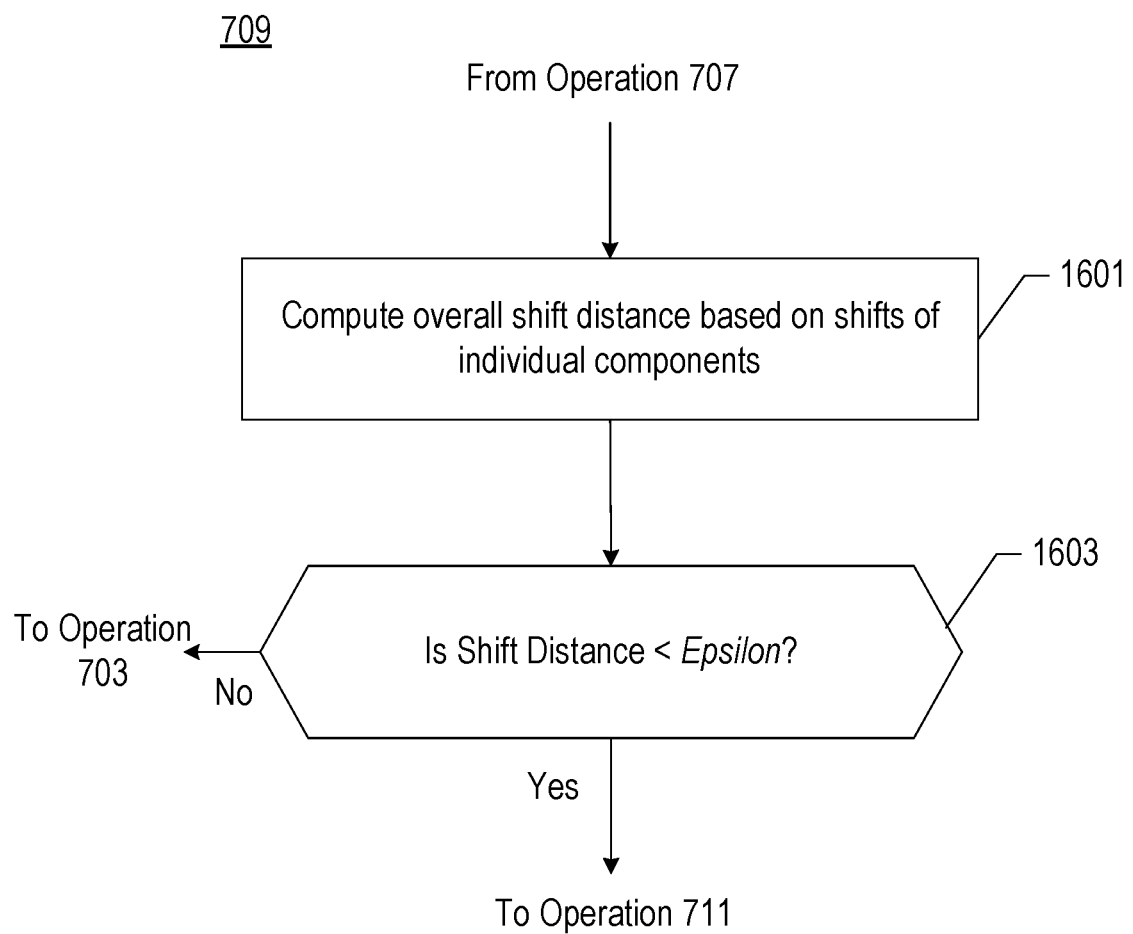
FIG. 16 depicts salient operations of method 709, by which wireless device 111 performs a convergence check to determine whether or not the discovery process has converged.

Operations in Performing a Convergence Check: FIG. 16 depicts salient operations of method 709 according to the illustrative embodiment, by which wireless device 111 performs a convergence check to determine whether or not the discovery process has converged sufficiently to a conclusion.

In accordance with operation 1601, wireless device 111 computes an overall shift distance, Distance, based on the shifts of the individual sensor node and light source components. The individual shift reflects the distance between the old and new x-y coordinates of a component in the topology.

In accordance with operation 1603, wireless device 111 checks for convergence based on the relationship Distance<Epsilon, wherein:
  Distance is the overall shift distance computed in accordance with operation 1601,
  Epsilon is the expression Threshold*Components*Scale,
  Threshold is the desired precision in the convergence (e.g., $1 \times 10^{-11}$, etc.),
  Components is the number of components whose topology is being discovered, and
  Scale is a scaling factor.

If the foregoing relationship is met, then the discovery process is deemed to have converged and control of task execution proceeds to operation 711. Otherwise, discovery processing continues and control of task execution proceeds back to operation 703.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  receiving, by a data-processing system, a first measurement of a first light source in relation to a first sensor, wherein the first measurement is received from the first sensor;
  receiving, by the data-processing system, a second measurement of the first light source in relation to a second sensor, wherein the second measurement is received from the second sensor;
  generating a first estimate of the position of the first light source, based on a first angle at the first sensor between (i) a first direction toward a current light source position and (ii) a second direction that is defined by the first measurement;
  generating a second estimate of the position of the first light source, based on a second angle at the second sensor between (i) a third direction toward the current light source position and (ii) a fourth direction that is defined by the second measurement;
  generating an updated light source position of the first light source based on the first estimate and the second estimate; and
  presenting the updated light source position of the first light source to a user.

2. The method of claim 1 further comprising:
  transmitting, by the data-processing system, a first message to the first sensor, wherein the first measurement is received in response to the transmitting of the first message; and
  transmitting, by the data-processing system, a second message to the second sensor, wherein the second measurement is received in response to the transmitting of the second message.

3. The method of claim 1 wherein the first measurement of the first light source is that of an angle in relation to a known, angular orientation of the first sensor.

4. The method of claim 1 wherein the first estimate of the position of the first light source and the second estimate of the position of the first light source define two of the vertices of a first polygon, and wherein the updated light source position of the first light source is defined by the geometric center of the first polygon.

5. The method of claim 4 further comprising:
  receiving, by the data-processing system, a third measurement of the first light source in relation to a third sensor; and
  generating a third estimate of the position of the first light source, based on a third angle at the third sensor between (i) a fifth direction toward the current light source position and (ii) a sixth direction that is defined by the third measurement;

wherein the third estimate of the position of the first light source define a third vertex of the first polygon.

6. The method of claim 1 further comprising:

generating a fourth estimate of the position of the first light source, based on a fourth angle at the first sensor between (i) a seventh direction toward a previous light source position and (ii) the second direction, wherein the previous light source position is generated prior to the current light source position;

generating a fifth estimate of the position of the first light source, based on a fifth angle at the second sensor between (ii) an eighth direction toward the previous light source position and (ii) the fourth direction; and generating the current light source position of the first light source based on the fourth estimate and the fifth estimate.

7. The method of claim 1 further comprising:

receiving, by the data-processing system, a fourth measurement of a second light source in relation to the first sensor;

generating a sixth estimate of the position of the first sensor, based on a sixth angle at the first light source between (i) a ninth direction toward a current sensor position and (ii) a tenth direction that is defined by the first measurement;

generating a seventh estimate of the position of the first sensor, based on a seventh angle at the second light source between (i) an eleventh direction toward the current sensor position and (ii) a twelfth direction that is defined by the fourth measurement;

generating an updated sensor position of the first sensor based on the sixth estimate and the seventh estimate; and presenting the updated sensor position of the first sensor to the user.

8. The method of claim 7 further comprising:

transmitting, by the data-processing system, a third message to the first sensor, wherein the fourth measurement is received in response to the transmitting of the third message.

9. The method of claim 7 wherein the updated light source position of the first light source and the updated sensor position of the first sensor define two of the vertices of a second polygon, and further comprising:

adjusting the position coordinates of at least one of the first light source and the first sensor according to the length of a diagonal of a rectangle in which the second polygon is inscribed.

* * * * *